US012492701B2

(12) United States Patent
Miller et al.

(10) Patent No.: US 12,492,701 B2
(45) Date of Patent: Dec. 9, 2025

(54) VARIABLE SPEED PUMPING SYSTEM AND METHOD

(71) Applicant: Pentair Water Pool and Spa, Inc., Cary, NC (US)

(72) Inventors: James Miller, Sanford, NC (US); Ryan Weaver, Cary, NC (US)

(73) Assignee: Pentair Water Pool and Spa, Inc., Cary, NC (US)

( * ) Notice: Subject to any disclaimer, the term of this patent is extended or adjusted under 35 U.S.C. 154(b) by 205 days.

(21) Appl. No.: 18/045,355

(22) Filed: Oct. 10, 2022

(65) Prior Publication Data

US 2023/0116404 A1     Apr. 13, 2023

Related U.S. Application Data

(60) Provisional application No. 63/262,284, filed on Oct. 8, 2021.

(51) Int. Cl.
  *F04D 15/00*     (2006.01)
  *E04H 4/12*      (2006.01)
  (Continued)

(52) U.S. Cl.
  CPC .......... *F04D 15/0066* (2013.01); *F04B 17/03* (2013.01); *F04B 49/06* (2013.01);
  (Continued)

(58) Field of Classification Search
  CPC .. F04D 15/0066; F04D 13/06; F04D 15/0077; F04D 27/004; F04B 49/20;
  (Continued)

(56) References Cited

U.S. PATENT DOCUMENTS 4,120,033 A    10/1978    Corso et al.
5,725,359 A     3/1998    Dongo et al.
(Continued)

FOREIGN PATENT DOCUMENTS

EP    3404267 A1    11/2018
EP    3620149 A1     3/2020
(Continued)

OTHER PUBLICATIONS

Extended European Search Report issued for European Patent Application No. 22200541.5, dated Feb. 20, 2023, 10 pages.

*Primary Examiner* — Peter J Bertheaud
(74) *Attorney, Agent, or Firm* — Husch Blackwell LLP

(57) ABSTRACT

A variable speed pumping system including a variable speed pump, a remote user device, and an auxiliary device is provided. The variable speed pump includes a motor, a drive, a housing including a drive cover, and an onboard controller. The onboard controller includes a plurality of buttons formed in the drive cover, a touchscreen interface positioned on the drive cover, a main circuit board including a non-transitory computer readable medium, the main circuit board being electrically coupled to the touchscreen interface, the motor, and the drive, a wireless communication unit electrically coupled to the main circuit board, and a selectively removable IO expansion module. The onboard controller is configured to control one of a flow rate of the pump or a speed of the motor for a period time and actuate the auxiliary device based on input received on one of the onboard controller or the remote user device.

20 Claims, 27 Drawing Sheets

(51) Int. Cl.
 *F04B 17/03* (2006.01)
 *F04B 49/06* (2006.01)
 *F04B 49/10* (2006.01)
 *F04B 49/20* (2006.01)
 *F04D 13/06* (2006.01)
 *F04D 25/06* (2006.01)
 *F04D 27/00* (2006.01)

(52) U.S. Cl.
 CPC ......... *F04B 49/065* (2013.01); *F04B 49/103* (2013.01); *F04B 49/20* (2013.01); *F04D 13/06* (2013.01); *F04D 15/0077* (2013.01); *F04D 27/004* (2013.01); *E04H 4/1209* (2013.01); *E04H 4/1245* (2013.01); *F04B 2203/0209* (2013.01); *F04D 25/068* (2013.01); *F04D 27/001* (2013.01); *F04D 27/008* (2013.01); *H02K 2211/03* (2013.01)

(58) Field of Classification Search
 CPC ...... F04B 49/065; F04B 49/06; F04B 49/103; F04B 17/03; F04B 2203/0209; E04H 4/1209; E04H 4/1245
 See application file for complete search history.

(56) References Cited

U.S. PATENT DOCUMENTS

| | | | |
|---|---|---|---|
| 6,121,746 A | 9/2000 | Fisher et al. | |
| 6,171,073 B1 | 1/2001 | McKain et al. | |
| 6,676,831 B2 | 1/2004 | Wolfe | |
| 8,209,794 B1 | 7/2012 | Harrison | |
| 8,573,951 B1 | 11/2013 | Beckham | |
| 9,212,835 B1 | 12/2015 | Berens | |
| 9,285,790 B2 | 3/2016 | Pruchniewski et al. | |
| 9,712,098 B2 | 7/2017 | Kidd et al. | |
| 9,740,199 B2 | 8/2017 | Michelon | |
| 9,822,782 B2 | 11/2017 | McKinzie | |
| 9,856,869 B2 | 1/2018 | Kruzel et al. | |
| 10,030,647 B2 * | 7/2018 | Ortiz | F04B 49/065 |
| 10,191,498 B2 | 1/2019 | Lewis et al. | |
| 10,240,606 B2 | 3/2019 | Stiles, Jr. et al. | |
| 10,296,016 B1 | 5/2019 | Payne et al. | |
| 10,465,676 B2 * | 11/2019 | Robol | F04B 19/00 |
| 10,527,042 B2 | 1/2020 | Stiles, Jr. et al. | |
| 10,590,926 B2 | 3/2020 | Kidd et al. | |
| 11,174,857 B1 * | 11/2021 | Kowalski | F04C 28/00 |
| 2010/0191487 A1 | 7/2010 | Rada et al. | |
| 2011/0286859 A1 * | 11/2011 | Ortiz | F04B 49/002 417/20 |
| 2012/0141301 A1 | 6/2012 | Van Der Spek et al. | |
| 2017/0183885 A1 | 6/2017 | Jackson | |
| 2018/0156211 A1 | 6/2018 | Bishop et al. | |
| 2018/0174207 A1 | 6/2018 | Potucek et al. | |
| 2018/0224822 A1 | 8/2018 | Potucek et al. | |
| 2020/0270889 A1 * | 8/2020 | Buosanto | F04D 13/06 |

FOREIGN PATENT DOCUMENTS

| | | |
|---|---|---|
| WO | 2008073436 A2 | 6/2008 |
| WO | 2011006557 A1 | 1/2011 |
| WO | 2019152665 A2 | 8/2019 |

\* cited by examiner

FIG. 10 "DEVICE SETTINGS" SCREEN

366 ─▶

Priming  Enabled ◯

Priming Speed (65-100%)  [EDIT]
100%

Max Priming Duration (1 min - 30 min)  [EDIT]
11 Min

[ ∧ ]

● ○ ○

"PRIMING PARAMETERS" SCREEN

Limits Parameters  Limits Min/Max 3HP

Min Speed (0-45%)  [EDIT]
0%

Max Speed (60-100%)  [EDIT]
100%

[ ∧ ]

● ○ ○ ○

"LIMITS PARAMETERS" SCREEN

Relays

You have assigned a device to each relay

Relay 1 (5 Amp)  Remove

Device  Others

Nickname  Lights

☑ Speed/Folw Dep  Salt cell

Others

Relay 2 (16 Amp)  Remove

Device  Others

Nickname  Hi Power Relay

☐ Speed/Folw Dependent ⓘ

FIG. 19

Priming

| | |
|---|---|
| Priming Disabled/Enabled | Disabled |
| Priming Speed (65-100%) | 66 |
| Max Priming Duration (5-30min) | 5 |
| Priming Range (1-10) | 5 |
| Priming Delay (1s-10min) | 10s |
| Loss of Prime | Disabled |

FIG. 20

Limits Min/Max

| | |
|---|---:|
| Min Speed (1-45%) | 1 |
| Max Speed (65-100%) | 100 |
| Min Flow (20-70 GPM) | 20 |
| Max Flow (80-160 GPM) | 90 |
| Flow Limit-Speed Programs | Disabled |
| Max Pressure est. (15-40PSI) | 40 |
| Pressure Limit - Speed Programs | Enabled |

FIG. 21

VARIABLE SPEED PUMPING SYSTEM AND METHOD

CROSS-REFERENCES TO RELATED APPLICATIONS

This application claims priority under 35 U.S.C. § 119 to U.S. Provisional Patent Application No. 63/262,284, filed Oct. 8, 2021, the entire contents of which are incorporated herein by reference.

BACKGROUND

Variable speed pumps are useful in pool, spa, and other aquatic applications to meet the variety of demands in any particular application. For example, in some instances a variable speed pump can be used to pump water to a number of features related to the particular application. With respect to a pool or spa, the variable speed pump can pump water to water jets, waterfalls, fountains, pool filtration equipment, pool vacuums, spillways and the like. Varying the speed of the pump can assist the filtration of the fluid, such as water, being moved by the pump for the aquatic application. For example, the aquatic application can include one or more filtration elements such as a strainer basket, diatomaceous earth filter, a sand filter, cartridge filter, hollow fiber membrane filter or the like. Thus, by varying the speed of the pump, the level of water filtration can be controlled. In this way, the pump can provide higher levels of filtration at higher speeds either when the demand for filtration is high or as part of schedule. When less filtration is needed, the pump can run at a lower speed to move less water to and from the aquatic application. In some instance, the variable speed pump may be operated at alternating high and low speeds in order to provide sufficient filtration while also consuming the least amount of power practicable.

While conventional variable speed pumps provide many benefits, they are also subject to various drawbacks. Some conventional pumps provide less sophisticated interfaces and control features in order to control the function of the pump. Accordingly, more sophisticated and versatile control mechanisms would be useful. In some instances, it would be useful to provide a variable speed pump that was capable of being highly integrated into a system of control mechanisms. Aside from controllability, conventional variable speed pumps lack in a number of structural areas. For example, some conventional pumps encounter issues with corrosion at the interface between the motor and the wet-end of the pump. To provide additional examples, pump positioning and motor heating can also present problems in conventional variable speed pumps. Accordingly, it would be useful to provide an improved variable speed pump for use in aquatic applications.

SUMMARY

Some embodiments provide a variable speed pumping system including a variable speed pump, a remote user device, and a first auxiliary device. The variable speed pump includes a motor, a drive, a housing including a drive cover, and an onboard controller. The onboard controller includes a plurality of buttons formed in the drive cover and a plurality of LED lights associated with the plurality of buttons, a selectively removable touchscreen interface positioned on the drive cover, a main circuit board including a non-transitory computer readable medium, the main circuit board being electrically coupled to the touchscreen interface, the motor, and the drive, a wireless communication unit electrically coupled to the main circuit board, and a selectively removable IO expansion module. The IO expansion module includes a plurality of relay terminals, and a plurality of digital input terminals. The remote user device is in wireless communication with the onboard controller and includes a display. The auxiliary device is electrically coupled to a first relay terminal of the plurality of relay terminals. The onboard controller is configured to control one of a flow rate of the pump or a speed of the motor for at least one period time and actuate the first auxiliary device based on input received on one of the onboard controller or the remote user device.

In some embodiments, the remote user device is configured to transmit instructions to the onboard controller to control one of the flow rate of the pump or the speed of the motor. In some forms, the remote user device is configured to transmit instructions to the onboard controller to control the activation of the first auxiliary device. In some forms, one or more of the remote user device or the onboard controller displays a status of the first auxiliary device. In some forms, the remote user device is configured to display a schedule during which the first auxiliary device is activated, receive an input to update the schedule, and transmit an updated schedule to the onboard controller. In some forms, the remote user device is configured to display a relay setup screen including a plurality of auxiliary device options, and the first auxiliary device is selected from the plurality of auxiliary device options. In some forms, the onboard controller activates the first auxiliary device during the at least one period of time. In some forms, the first auxiliary device is one of a lighting assembly, a salt chlorine generator, a water quality monitor, a booster pump, a chlorinator or other chemical dispensing system, a pool vacuum, a water feature, a fountain, or a heater. In some forms, the at least one period of time comprises a pump schedule during which the flow rate of the pump or the speed of the motor is periodically controlled, the pump schedule being programmable with the remote user device. In some forms, the first auxiliary device is programmed to be associated with the pump schedule using one of the remote user device or the onboard controller. In some forms, a second auxiliary device is electrically coupled to a second relay terminal of the plurality of relay terminals. In some forms, the onboard controller activates the first auxiliary device during a first time period and the second auxiliary device during a second time period. In some forms, the onboard controller activates both the first auxiliary device and the second auxiliary device during a first period of time. In some forms, the onboard controller only activates the first auxiliary device when the second auxiliary device is activated.

Some embodiments provide a variable speed pumping system including a variable speed pump and an auxiliary device. The variable speed pump includes a motor, a drive, a housing, and an onboard controller. The onboard controller includes a main circuit board including a non-transitory computer readable medium, the main circuit board being electrically coupled to the motor and the drive, and a selectively removable IO expansion module including a plurality of relay terminals being electrically coupled to the main circuit board. The auxiliary device is electrically coupled to one of the plurality of the relay terminals. The onboard controller is configured to control one of a flow rate of the pump or a speed of the motor for a period time, activate the auxiliary device when a flow of water is delivered via the variable speed pump, and deactivate the auxiliary device when the flow of water is not delivered via the variable speed pump.

In some embodiments, the onboard controller further comprises a wireless communication unit electrically coupled to the main circuit board. In some forms, the onboard controller is configurable with a remote user device. In some forms, activation of the auxiliary device is dependent on a volumetric flow of water through the variable speed pump. In some forms, activation of the auxiliary device is dependent on the speed of the motor.

Some embodiments provide a variable speed pumping system including a variable speed pump, and a plurality of auxiliary devices. The variable speed pump includes a motor, a drive, a housing, and an onboard controller. The onboard controller includes a touchscreen interface positioned on the housing, a main circuit board including a non-transitory computer readable medium, the main circuit board being electrically coupled to the motor and the drive, and a selectively removable IO expansion module including a plurality of relay terminals being electrically coupled to the main circuit board. The plurality of auxiliary devices are electrically coupled to the plurality of relay terminals. The onboard controller is configured to control one of a flow rate of the pump or a speed of the motor according to a pump schedule and activation of each of the plurality of auxiliary devices is dependent on the pump schedule Some embodiments provide a method of operating a variable speed pumping system. The method includes measuring a first power consumption value of a pool pump at a first speed, estimating a first total dynamic head value at the first speed, measuring a second power consumption value of the pool pump at a second speed, estimating a second total dynamic head value at the second speed, and generating a system friction curve based on the first total dynamic head value and the second total dynamic head value. The method also includes categorizing the variable speed pumping system into a pumping system category based on the system friction curve, recommending an updated pump operation schedule based on the pumping system category, and displaying a comparison between the updated pump operation schedule and a current pump operation schedule.

In some forms, the method includes measuring a third power consumption value of the pool pump at a third speed and estimating a third total dynamic head value at the third speed. In some forms, the method includes generating the system friction curve based on the first total dynamic head value, the second total dynamic head value, and the third total dynamic head value. In some forms, the updated pump operation schedule is defined by one or more of a turnover rate, a speed of the pool pump, a flow rate of the pool pump, or an activation time period of the pool pump. In some forms, the updated pump operation schedule includes one or both of three recommended pump speeds or three recommended flow rates. In some embodiments, the method includes automatically updating one or more of a pump motor speed, a pump flow rate, a pool circulation system valve orientation, a pool heating schedule, a pool sanitization schedule and a filter backwash schedule based on the system friction curve. In some forms, the method includes measuring a current power consumption value of the pool pump over a current period of time during the current pump operation schedule and estimating an updated power consumption value of the pool pump over an updated period of time based on the updated pump operation schedule. In some forms, the method includes measuring a current power consumption of the pool pump over a current period of time during the current pump operation schedule and estimating an updated power consumption value of the pool pump based on an expected change in system friction curve due to filter loading. In some forms, the method includes displaying a comparison of the current power consumption value and the updated power consumption value on a remote device. In some forms, the current period of time is one calendar month and the updated period of time is one calendar month. In some forms, the method includes calculating a current energy cost associated with the current power consumption value, calculating an updated energy cost associated with the updated power consumption value, and displaying on the remote device a comparison between the current energy cost and the updated energy cost. In some forms, the method includes displaying a recommended pool product or activity to reduce system friction.

Some embodiments provide method of operating a variable speed pumping system. The method includes providing a pool circulation system including a variable speed pump, a first pressure sensor, and a filter downstream of the variable speed pump, measuring a first pressure value in the pool circulation system at a first pump speed, estimating a first total dynamic head value at the first pump speed based on a first power consumption value of the variable speed pump, measuring a second pressure value in the pool circulation system at a second pump speed, estimating a second total dynamic head value at the second pump speed based on a second power consumption value of the variable speed pump, and generating a system friction curve based on the first pressure value, the first total dynamic head value, the second pressure value, and the second total dynamic head value. The method also includes categorizing the variable speed pumping system into a pumping system category based on the system friction curve, recommending an updated pump operation schedule based on the system friction curve, and displaying a comparison between the updated pump operation schedule and a current pump operation schedule.

In some embodiments, the first pressure sensor is positioned on a discharge side of the variable speed pump, and the first pressure value is measured by the first pressure sensor. In some embodiments, a second pressure sensor is positioned downstream of the filter, and a first auxiliary pressure value is measured by the second pressure sensor. In some forms, a flow meter is positioned in the pool circulation system, and a first flow value is measured by the flow meter. In some forms, the system friction curve is generated based on the first pressure value, the first total dynamic head value, the second pressure value, the second total dynamic head value, the first auxiliary pressure value, and the first flow value. In some forms, the first total dynamic head value is estimated based on the first power consumption value, the first pressure value, the first auxiliary pressure value, and the first flow value. In some forms, the method includes automatically initiating the updated pump operation schedule, wherein the updated pump operation schedule includes one or more of an updated pump speed, an updated pump flow rate, or an updated pump operation time based on the system friction curve.

In some forms, the system friction curve is generated from a total dynamic head value based on a third pressure sensor positioned on the suction side of the pump, the first pressure sensor installed on the discharge side of the pump, and a flow value measured by the flow meter. In some forms, the total system friction curve is partitioned into a plurality of values generated by any meaningful combination of estimated total dynamic head, first, second and third pressure sensor values at a flow value thereby creating discrete definitions for friction curves of different regions of the system. Advantageously, this allows for monitoring and detection of different events such as filter loading, valve actuation, and skimmer basket loading, among others.

Some embodiments provide a method of operating a variable speed pumping system. The method includes monitoring a flow rate of water through a pool circulation system, calculating a total gallons pumped value over a first time period, and displaying a recommended pool turnover rate characterized by one of a flow rate, an active flow time, and a periodic pump activation. In some forms, the method includes categorizing the variable speed pumping system as one of high-use, standard-use, or light-use based on the total gallons pumped value, and recommending one or more of a pump service schedule, a pool pad equipment recommendation, or an equipment replacement schedule based on the category of the variable speed pumping system.

A variable speed pumping system coupled to a fluid circuit of an aquatic application is provided. The variable speed pumping system includes a motor and a variable speed drive in electrical communication with the motor, a housing designed to substantially enclose the motor and the variable speed drive, a controller configured to provide user control of the variable speed drive, and an electrical communication assembly in communication with the controller.

In some aspects, the controller is provided in the form of an onboard controller having one or more physical buttons located on the housing of the pumping system, a touchscreen display optionally coupled to the housing of the pumping system, an automation device, or a remote user device. The variable speed pumping system may further include a rotatable drive cover positioned adjacent the variable speed drive. The electrical communication assembly includes an IO expansion module, and in some forms, the IO expansion module is disposed under a rotatable drive cover. In some instances, the IO expansion module is removable from the variable speed pumping system and is designed to be attached in a remote location with respect to the variable speed pumping system housing. In some instances, the electrical communication assembly further includes an RS-485 terminal block and a main power terminal block. Further, the pump may be connected to its own independent GFI-protected circuit.

In some aspects, the IO expansion module is defined by a module circuit board and a module cover. The IO expansion module includes one or more pump relay terminal blocks and one or more digital input terminals that are separated by a divider of the module cover. The IO expansion module is defined by a W1 parameter representing a width dimension of a main body of the IO expansion module, a W2 parameter representing a width dimension of the entire IO expansion module including a side ledge, a D1 parameter representing a depth dimension of the main body of the IO expansion module, and a D2 parameter representing a depth dimension of the entire IO expansion module including a front ledge, but not an edge connector. The ratio of W1 to W2 is between about 1:1.1 and about 1:2. The ratio of the D1 parameter to the D2 parameter is between about 1:1.1 and about 1 to about 2. The ratio of the D1 parameter to the W1 parameter is between about 1:1 and about 1:3, and the ratio of the D2 parameter to the W2 parameter is between about 1:1 and about 1:3.

A variable speed pumping system for a swimming pool or spa is also provided. The variable speed pumping system includes a motor and a variable speed drive in electrical communication with the motor, a housing designed to substantially enclose the motor and the variable speed drive, a controller configured to provide user control of the variable speed drive, and an electrical communication assembly in communication with the controller. The electrical communication assembly has a removable IO expansion module including a first relay terminal block, a second relay terminal block, and a plurality of digital input terminals.

In some instances, the first relay terminal block is rated to provide a maximum of 5 A and the second relay terminal block is rated to provide a maximum of 16 A. In other aspects, the first relay terminal block includes four terminals, two of which can be electrically coupled to an auxiliary power supply or circuit breaker, and two of which can be electrically coupled to a first auxiliary device and a second auxiliary device, respectively. The first (or second) auxiliary device is provided in the form of a lighting assembly, a salt chlorine generator, a water quality monitor, a booster pump, a single speed pump, a spa blower, a chlorinator, a pool vacuum, a water feature, a fountain, a heater, or other pool accessory. The plurality of digital input terminals provide an electrical connection between the variable speed pumping system and an automation device. In some aspects, the plurality of digital input terminals provide a plurality of speed control or flow control terminals, such that the automation device can cause the variable speed pumping system to run at a plurality of speeds or volumetric flow rates. In further aspects, four or more pump speeds or flow rates can be initiated by the automation device.

A variable speed pump coupled to a fluid circuit of an aquatic application is also disclosed. The pump includes a motor and a variable speed drive in electrical communication with the motor, a housing designed to substantially enclose the motor and the variable speed drive, a controller configured to provide user control of the variable speed drive, an antenna provided on and extending from the housing, an electrical communication assembly in communication with the controller, and a first auxiliary device in communication with the variable speed pumping system.

In some instances, the controller includes an input mechanism provided in the form of physical buttons located on the housing of the pump, a touchscreen display optionally coupled to the housing of the pump, an automation device, or a remote user device. The first auxiliary device is provided in the form of a lighting assembly, a salt chlorine generator, a water quality monitor, a booster pump, a single speed pump, a spa blower, a chlorinator, a pool vacuum, a water feature, a fountain, a heater, or other pool accessory. The first auxiliary device is connected to the pump via the electrical communication assembly. The controller transmits and receives data from the first auxiliary device. In some instances, the controller transmits instructions to control the first auxiliary device. In some forms, the controller further transmits and receives data from one or more external sensing devices provided in the form of a flow meter, a flow switch, a temperature sensor, a TDS sensor, or a pH sensor.

The first auxiliary device is a water quality monitor and data is provided in the form of a temperature value, an oxidation reduction potential (ORP) value, or a pH value. The pump uses the sensor data to change one of an operating function of the pump or an operating function of the water quality monitor. The operating function of the pump is one of a flow rate, a pump speed, or a pump schedule. In another instance, the first auxiliary device is a pool lighting assembly. The pump transmits instructions to the pool lighting assembly in the form of power off/on, a schedule for illumination, duration of illumination, pattern of designs, color to be illuminated, or animation types. In a further instance, the first auxiliary device is a pool heater. The pump transmits instructions to the pool heater in the form of a particular set point, power on or off, or heater schedule. In some forms, the pump transmits instructions to the pool heater in response to a temperature sensed by the pump, a temperature sensed by the pool heater, or a temperature sensed by another network connected external temperature sensor.

The controller further includes one or more physical buttons such that the variable speed pump can be controlled in a local mode without any network connectivity or communication with other devices. The one or more physical buttons may each include an overlay seal and an actuating portion. In one specific instance, the one or more physical buttons are provided in the form of a network connection button, a quick clean button, and an on/off button. In other aspects, the controller is provided in the form of a capacitive touch screen display. The capacitive touch screen display can be selectively removable from the housing and mountable in a remote location.

BRIEF DESCRIPTION OF THE DRAWINGS

The accompanying drawings, which are incorporated in and form a part of this specification, illustrate embodiments of the invention and, together with the description, serve to explain the principles of embodiments of the invention:

FIG. 9-12B illustrate various screens from a virtual environment of the touchscreen of FIG. 7A;

FIGS. 14-22 illustrate various screens from the virtual environment of the remote device of FIG. 13;

DETAILED DESCRIPTION

Figure 1:
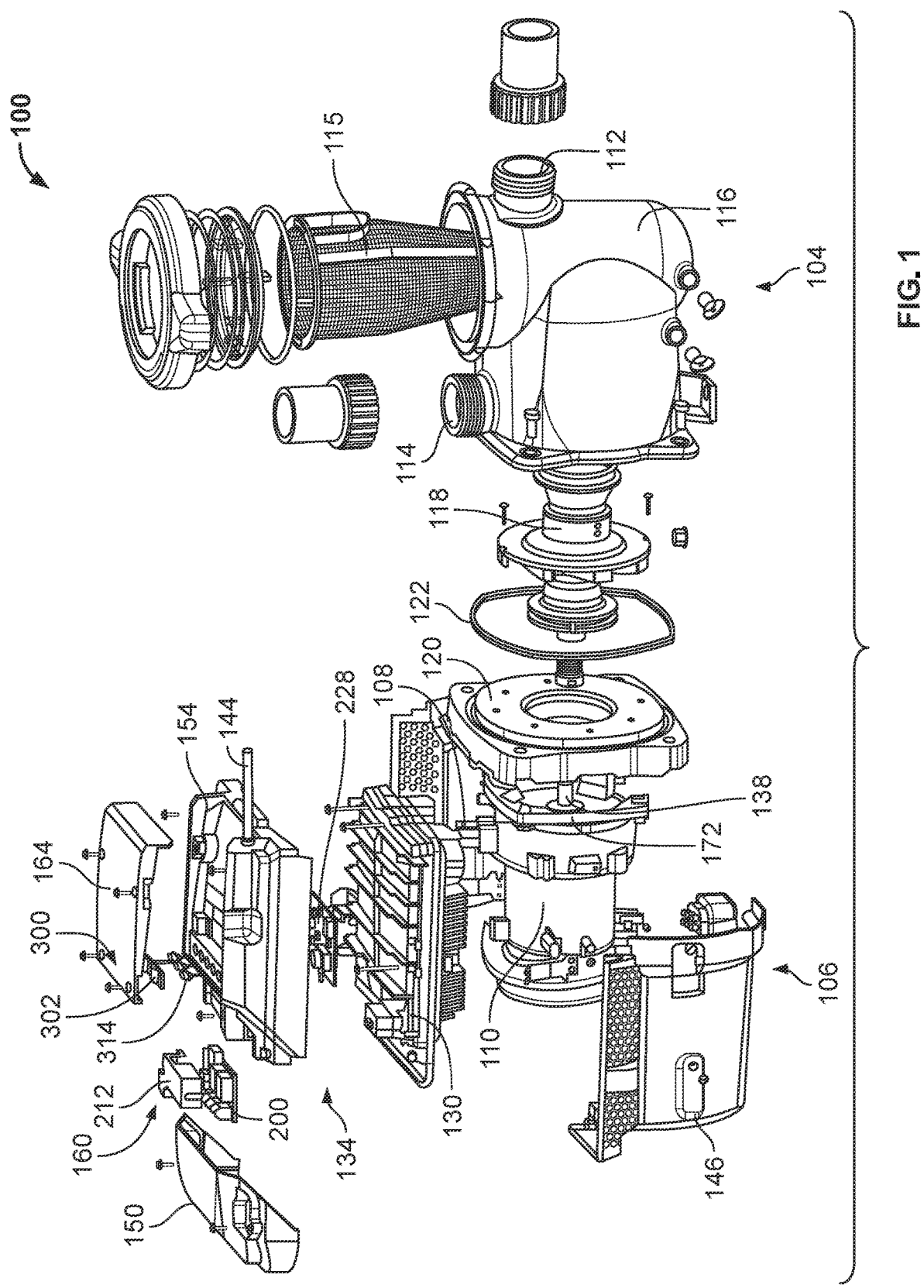
FIG. 1 is an exploded side isometric view of a pump according to an embodiment.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Before any embodiments of the invention are explained in detail, it is to be understood that the invention is not limited in its application to the details of construction and the arrangement of components set forth in the following description or illustrated in the attached drawings. The invention is capable of other embodiments and of being practiced or of being carried out in various ways. Also, it is to be understood that the phraseology and terminology used herein is for the purpose of description and should not be regarded as limiting. For example, the use of "including," "comprising," or "having" and variations thereof herein is meant to encompass the items listed thereafter and equivalents thereof as well as additional items.

As used herein, unless otherwise specified or limited, the terms "mounted," "connected," "supported," and "coupled" and variations thereof are used broadly and encompass both direct and indirect mountings, connections, supports, and couplings. Further, unless otherwise specified or limited, "connected" and "coupled" are not restricted to physical or mechanical connections or couplings.

As used herein, unless otherwise specified or limited, "at least one of A, B, and C," and similar other phrases, are meant to indicate A, or B, or C, or any combination of A, B, and/or C. As such, this phrase, and similar other phrases can include single or multiple instances of A, B, and/or C, and, in the case that any of A, B, and/or C indicates a category of elements, single or multiple instances of any of the elements of the categories A, B, and/or C.

As explained above, it would be useful to provide an improved variable speed pump for an aquatic application. More particularly, a variable speed pump that is fluidly coupled to a fluid circuit of an aquatic application in order to move a fluid such as water to and from an aquatic application. FIG. 1 illustrates a variable speed pump 100 according to one embodiment. The variable speed pump 100 includes a wet end 104 and a power end 106, which houses a motor 110. The motor 110 can be a permanent magnet motor, a synchronous motor, an induction motor, or other motor types known in the art, and the motor 110 can also be a totally enclosed fan-cooled motor. The wet end 104 includes an inlet 112 and an outlet 114 that are fluidly coupled to a fluid circuit/pool circulation system of an aquatic application such that water (or another fluid) from the aquatic application can be drawn into the inlet 112 and be pumped out of the outlet 114. In some forms, the pump 100 is installed at a minimum of five feet from the inside wall of the pool, three feet from any heater outlet, and no more than ten feet above the pool water level. In some forms, a 3-inch clearance is provided on the sides and rear of the pump 100 and is secured by two anchor points.

The variable speed pump 100 is designed to move water through the fluid circuit to and from the aquatic application. In some forms, one or both of the inlet 112 and the outlet 114 include a check valve, e.g., a suction-side check valve and a return/pressure-side check valve, to prevent back flow, to isolate the pump for maintenance, and/or to carry out the preliminary steps of a pump priming process. The wet end 104 contains a volute or strainer pot 116 within which an impeller 118 and a strainer basket 115 are located. The wet end 104 interfaces with the power end 106 via a seal plate 120, which can include an O-ring 122 or other sealing structure to prevent water from seeping out of the pump 100 from the wet end 104. The motor 110 also includes a motor flange 172 that is coupled to the seal plate 120.

The power end 106 includes the motor 110, a variable speed drive 130 provided adjacent and above the motor 110, and an onboard controller 134. In some forms, the motor flange 172 and/or the body of the motor 110 includes a drive connection port 108 through which the motor 110 is electrically connected to the drive 130. As such, the drive 130 is removable and replaceable by disconnecting the drive 130 from the drive connection port 108. The motor 110 includes a drive shaft 138 that extends through the seal plate 120 and is coupled to the impeller 118. Accordingly, the motor 110 produces torque in the drive shaft 138 to rotate the impeller 118, which moves water in through the inlet 112 and out through the outlet 114 of the wet end 104. The variable speed drive 130 is in electrical communication with the onboard controller 134 and the motor 110. In some instances, the variable speed drive 130 provides substantially infinitely variable speed control of the motor 110.

The onboard controller 134 can be coupled to the power end 106 of the pump 100 and can be configured to provide user control of the variable speed drive 130. In some instances, the controller 134 is positionally adjustable with respect to an outer housing of the power end 106. In some instances, the onboard controller 134 includes a USB or other known electrical connection port to which a programming device can be attached to upload or update the software installed on the controller 134. In some other embodiments, the software installed on the controller 134 can be updated via wireless over-the-air updates. The outer housing of the power end 106 can comprise multiple parts. For example, the outer housing can be provided in the form of a motor cover or shroud 146, an end cover 150, a drive cover 154, and a user interface cover 164. The motor cover 146 can be provided with various venting arrangements to provide appropriate cooling of the drive 130 and the motor 110. The configuration of the outer housing illustrated in FIG. 1 is not meant to be limiting and can also be provided as a number of other cover piece combinations or as a single integrated part. The drive cover 154 can be sized and shaped to receive an IO expansion module 160 which will be described below. The outer housing can also accommodate an antenna 144. In some forms, the IO expansion module 160 can be removable and mountable to a remote location, such as to a nearby wall, and connected to the onboard controller 134 via a cable providing power, communication capabilities, or both.

Figure 2:
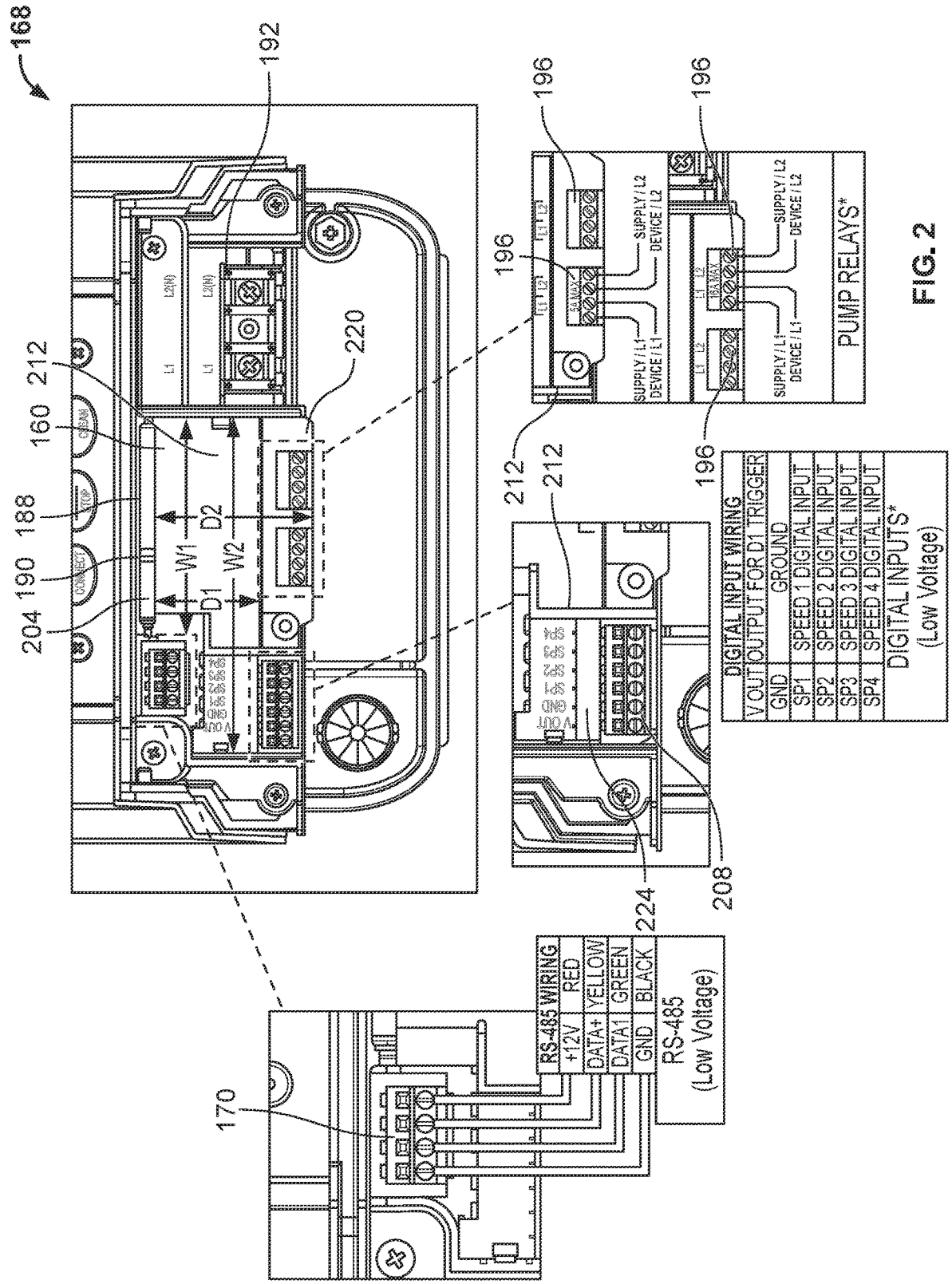
FIG. 2 is a partial top plan view of the pump of FIG. 1 with some parts removed for clarity.

FIG. 2 illustrates an electrical communication assembly 168 for the pump 100. The electrical communication assembly 168 is provided underneath the end cover 150, which protects the electrical communication assembly 168 against physical disturbances and direct contact with liquids, such as rain or pool water. The electrical communication assembly 168 includes the IO expansion module 160, which is an optional and removable feature of the electrical communication assembly 168, an RS-485 terminal block 170, and the main power terminal block 192. The pump 100 can be connected to its own independent GFI-protected circuit.

Each of the elements of the electrical communication assembly 168, as well as the antenna 144, are electrically coupled to the onboard controller 134, which includes a main circuit board 228 (see FIG. 1). In some forms, the main circuit board 228 includes a memory unit or a non-transitory computer readable medium. In some forms, the main circuit board 228 includes a wireless communication unit such as low power system on a chip to provide Wi-Fi and/or Bluetooth capabilities, which will be described further below. The RS-485 terminal block 170 includes the standard wired terminal connections for RS-485 serial communication, and can be configured as half-duplex or full duplex communication. The RS-485 terminal block 170 provides the option of electrically coupling an automation device 176 (see FIG. 3) to the pump 100, which allows data to be transmitted to and from the onboard controller 134 and the automation device 176, and allows the automation device 176 to assume control over the pump 100. In some forms, the control can be provided as master-slave control in which the pump 100 is slaved to the automation device 176.

Figure 3:
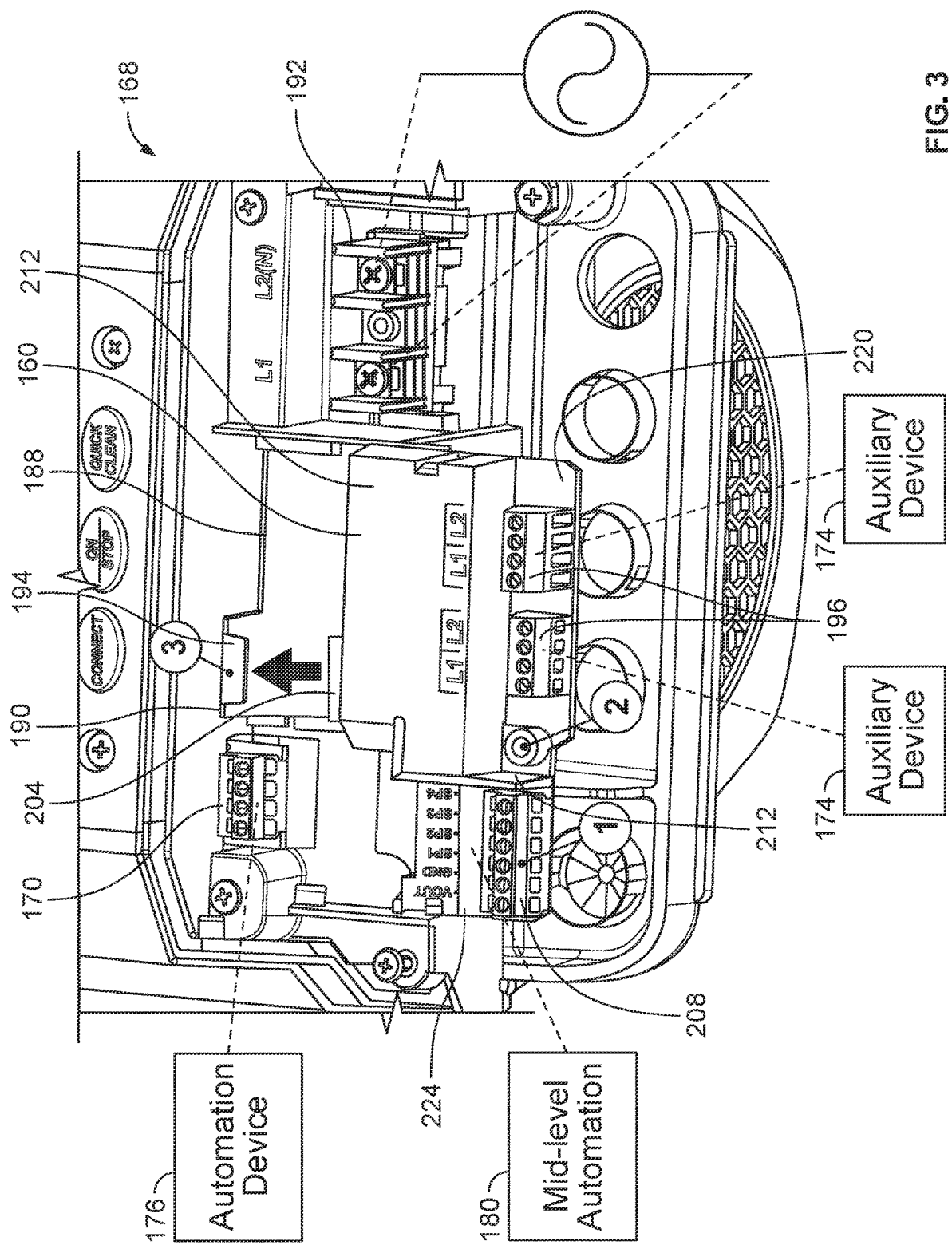
FIG. 3 is a partial top isometric view of the pump of FIG. 1 with some parts removed for clarity.
Figure 4:
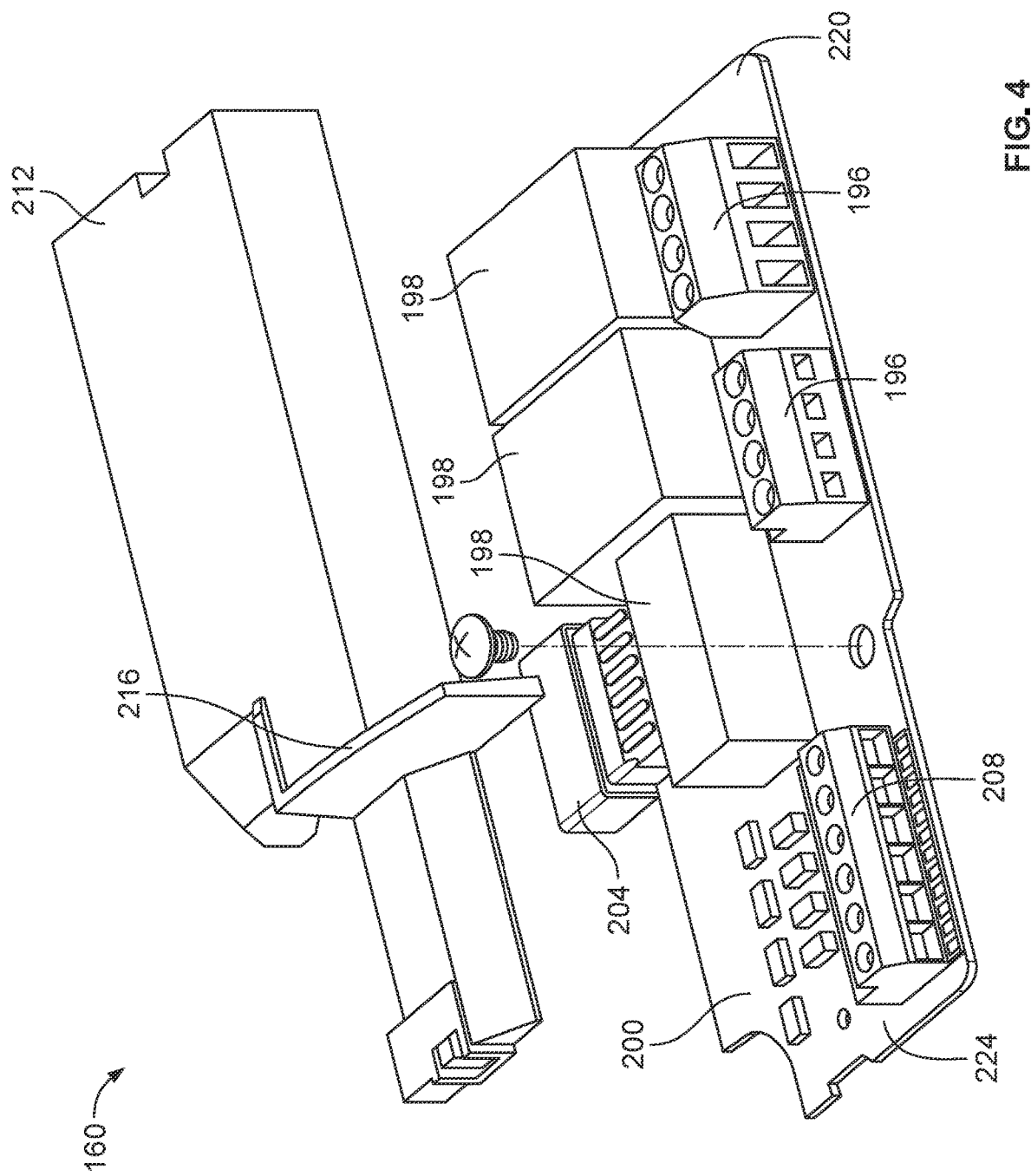
FIG. 4 is an exploded isometric view of an IO expansion module of the pump of FIG. 1.

FIGS. 2-4 illustrate the IO expansion module 160 in further detail. In some embodiments, the IO expansion module 160 is defined by a module circuit board 200 and a module cover 212, which in some forms can be selectively coupled and decoupled with the module circuit board 200 e.g., via snap connection. The shape of the cover 212 can be provided as an irregular polyhedron that corresponds to a receptacle 188 provided on the drive cover 154. The main body of the IO expansion module 160 can generally be provided in the form of a rectangular prism, having one or more chamfered edges. On the back side of the IO expansion module 160, an edge connector 204 extends backward to be received within an opening 190 of the drive cover 154. The edge connector 204 mates with, and is electrically coupled to, a male connector 194 of the main board 228 of the electrical communication assembly 168. One or more pump relay terminal blocks 196 and one or more digital input terminals 208 can be provided on the IO expansion module 160, and the relay terminal blocks 196 can be separated from the digital input terminals 208 by a divider 216 of the module cover 212. The relay terminal blocks 196 can be provided on a front ledge 220 of the module circuit board 200 that extends outward from the front of the IO expansion module 160, and the digital input terminals 208 can be provided on a side ledge 224 of the module circuit board 200. In some forms, when the IO expansion module 160 is installed, at least part of the side ledge 224 extends at least partly underneath the RS-485 terminal block 170. The IO expansion module 160 can be positioned in between the RS-485 terminal block 170 and the main power terminal block 192.

As illustrated in FIGS. 2 and 3, the IO expansion module 160 can be provided in various dimensions suitable for including the pump relay terminals blocks 196, the digital input terminals 208, and the edge connector 204, while also fitting underneath the end cover 150 of the outer housing.

For example, W1 represents the width dimension of the main body of the IO expansion module 160, W2 represents the width dimension of the entire IO expansion module 160 including the side ledge 224, D1 represents the depth dimension of the main body of the IO expansion module 160, and D2 represents the depth dimension of the entire IO expansion module 160 including the front ledge 220 but not the edge connector 204. In some forms, the ratio of W1 to W2 is between about 1:1.1 and about 1:2. In some forms, the ratio of D1 to D2 is between about 1:1.1 and about 1 to 2. In some forms, the ratio of D1 to W1 is between about 1:1 and about 1:3. In some forms, the ratio of D2 to W2 is between about 1:1 and about 1:3.

As mentioned above, the IO expansion module 160 can provide multiple relay terminal blocks 196 and digital input terminals 208. In some instances, one or more relays 198 are electrically coupled to the main circuit board 228 and each of the relay terminal blocks 196 to control the delivery of incoming and outgoing 115 VAC or 230 VAC. The relays 198 can be configured to provide the same or different amperage limits, and the relays 198 can be activated at the same time or at different times. For example, one of the relays 198 can provide a higher current limit, and one of the relays 198 can provide a lower current limit. As a non-limiting example, the left-most relay 198 can be rated to provide a maximum of 8 A and the right-most relay 198 can be rated to provide a maximum of 30 A.

In some instances, the left-most relay 198 can be rated to provide a maximum of 5 A and the right-most relay 198 can be rated to provide a maximum of 16 A. In some forms, the right-most relay terminal block 196 can be electrically coupled to two of the relays 198 while the left-most relay terminal block 196 can be electrically coupled to a third one of the relays 198 or vice versa. In this way, a variety of devices can be connected to, powered by, and controlled through, an electrical connection with the relays 198. Each relay terminal block 196 includes four terminals, two of which can be electrically coupled to an auxiliary power supply and/or circuit breaker and two of which can be electrically coupled to the relayed auxiliary device(s) 174. Examples of auxiliary devices 174 that can be electrically coupled to the relay terminal blocks 196 include, for example, lighting assemblies, salt chlorine generators, water quality monitors, booster pumps, single speed pumps, spa blowers, chlorinators, pool vacuums, water features, fountains, heaters, or other pool accessories and equipment. In some forms, the pump 100 can include a combination of data and power transmission instead of, or in addition to, the relays 198. For example, rather than being coupled to the relays 198, any of the auxiliary devices 174 can be coupled via a wired connection to a control port of the pump 100 that provides power to the auxiliary devices 174 as well as two-way communication. In some forms, all of the data transmission and communication between the pump 100 and the auxiliary devices 174 occurs wirelessly.

The digital input terminals 208 can provide an electrical connection between the pump 100 and a mid-level automation device 180. The digital input terminals 208 can provide a plurality of speed control or flow control terminals, such that the mid-level automation device 180 can cause the pump 100 to run at a plurality of pump speeds, e.g., revolutions per minute (RPM) or volumetric flow rates, e.g., gallons per minute (GPM). In some instances, four or more pump speeds or flow rates can be initiated by the mid-level automation device 180. The main circuit board 228 can be programmed such that when the automation device 176 is electrically connected to the RS-485 terminal block 170, the digital input terminals 208 are ignored. In some forms, when the automation device 176 is electrically connected to the RS-485 terminal block 170, the relays 198 are deactivated such that there can be no pass-through control of the auxiliary devices 174 from the automation device 176. In some forms, pass-through control of the auxiliary devices 174 from the automation device 176 is simply absent, e.g., not a provided functionality. In some forms, however, the automation device 176 can control all aspects of the operation of the pump 100 as well as all aspects of the operation of the auxiliary devices 174, providing pass-through control of auxiliary devices 174 that are connected to the relays 198 from the automation device 176. For example, if a lighting assembly is connected to the pump 100, and the pump 100 is connected to the automation device 176, the automation device 176 can send instructions that will implement lighting assembly logic to turn the lighting assembly on/off, light up in different colors, or provide various animations.

The main circuit board 228 may be provided with one or additional components provided in the form of electronics, software, sensors, actuators, and/or network connectivity to collect and exchange data. In some embodiments, the main circuit board 228 may send and/or receive data transmissions over a local area network (LAN), a wide area network (WAN), and/or another communication network using any suitable communication protocol. For example, the main circuit board 228 may communicate over the LAN with a local server computing device, such as in a private network where transmitted data to/from the main circuit board 228 is isolated from the internet or another WAN, at least until the data is processed by the local server. In some embodiments, (a) local server(s) may be operated at the same location as the pump 100, such as at a residence or business. A user device may also be connected to the LAN in order to access the data; alternatively, IP connectivity may be used, connecting the LAN and/or the local server(s) to the Internet or another WAN, so that local and/or remote user devices can access the local server.

Further, the main circuit board 228 may connect directly or through a router, gateway, base station, etc. (shown as wired/wireless router or gateway), to the WAN in order to communicate with cloud-based computing resources. Such an environment provides a bi-directional, direct-to-cloud communication between the main circuit board 228 and one or more application and/or hosting servers. In some embodiments, the main circuit board 228 may communicate with and directly use the resources of one or more physical, remote server computing devices, which may be deployed in one or more data centers (for example) in a particular geographic location or dispersed throughout several geographic locations. In other embodiments, the remote physical servers may cooperate to provide virtualized computing resources that can be allocated for use by, for example, an authorized user of a computing resource service provider. In various embodiments, the server may be a virtual server or may represent a cluster of servers. In some forms, the server can be confirmed to store and provide data analytics associated with any variety of operational, maintenance, scheduling, or other parameters related to the pump 100 over time, such as flow rates, pump speeds, temperatures, pump power consumption value, e.g., kilowatt-hours over a period of time such as a week, system pressure, the total dynamic head, and total gallons pumped.

Non-limiting examples of communication protocols include: a wired (e.g., CAT5, USB) connection to a router and any TCP/IP protocol for wired connections; a wireless connection to a router, and wireless TCP/IP protocols such as Wi-Fi or MQTT; and/or direct communication with another IoT device using the above wireless protocols or other suitable protocols such as Bluetooth or Wi-Fi direct. More generally, a communication network can include a Wi-Fi network (e.g., an 802.11x network, which can include one or more wireless routers, one or more switches, etc.), a peer-to-peer network (e.g., a Bluetooth network, a ZigBee® network, a Z-Wave® network, a proprietary RF connection, etc.), a cellular network (e.g., a 3G network, a 4G network, a 5G network etc., complying with any suitable standard, such as CDMA, GSM, LTE, LTE Advanced, WiMAX, etc.), a wired network, an EnOcean® network, etc. In some embodiments, the communication network can be a LAN, a WAN, a public network (e.g., the Internet), a private or semi-private network (e.g., a corporate or university intranet), any other suitable type of network, or any suitable combination of networks.

In some embodiments, the antenna 144 is configured to send and/or receive wireless signals, such as signals for communicating over Wi-Fi, Bluetooth, ZigBee, Z-Wave, free-space optical, etc. In some such embodiments, the antenna 144 can receive signals from the wireless gateway module and can transmit the signals to the main circuit board 228 for processing into commands. Additionally, or alternatively, the antenna 144 can send signals generated by the main circuit board 228 to the wireless gateway/router. In some embodiments, the main circuit board 228 can communicate with server(s) and/or other IoT devices in the network using the antenna 144. For example, the antenna 144 can be used to communicate using a direct connection (e.g., over a Bluetooth connection, over a direct Wi-Fi connection such as an ad hoc Wi-Fi connection or Direct Wi-Fi connection), and/or an indirect connection (e.g., over a LAN, over a mesh network, etc.).

Figure 5:
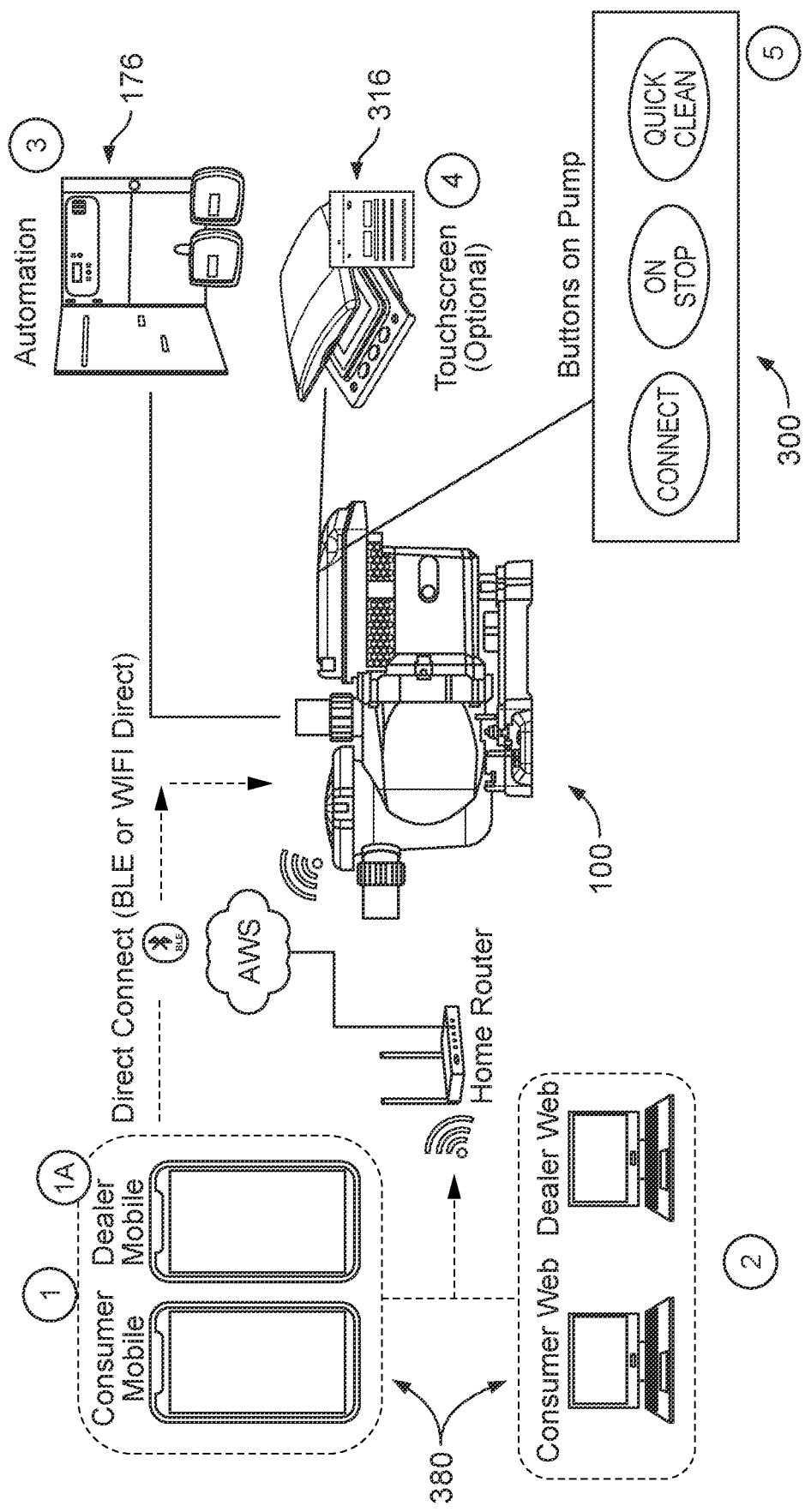
FIG. 5 is a schematic diagram of the pump of FIG. 1 within a communication network.

As illustrated in FIG. 5, because the pump 100 is provided with a main circuit board 228 that can provide various network connections to send and receive data, users can configure, control, send and receive data, and otherwise operate the pump 100 through a variety of interfaces. A few non-limiting examples of such input mechanisms include: physical buttons 300 located on the pump 100 itself; a touchscreen display 316 optionally coupled to the pump 100, the automation device 176; the mid-level automation device 180; and/or one or more remote user devices 380 such as a consumer mobile device, a dealer mobile device, a consumer web-based device, or a dealer web-based device. Further, other network connected pool pad equipment such as a lighting assembly, a salt chlorine generator, a water quality monitor, a booster pump, a single speed pump, a chlorinator, a pool vacuum, a water feature, a fountain, a heater, or other devices can communicate with the pump 100 via wired or wireless connections based on any of the communication means described above, such as a mesh network, bluetooth, Wi-Fi, Wi-Fi direct, among other forms of communication. Further, the pump 100 can include any and all logic required to operate the pool pad equipment described herein, and can control, or transmit instructions to control, and coordinate the function of the pool pad devices with the operation of the pump 100.

Accordingly, the pump 100 can receive data or operating information from other network connected pool pad equipment, and can send that data or operating information to a server or the remote user device 380. Similarly, the remote user device 380 can send instructions to pump 100 and the pump 100 can transmit those instructions to any of the network connected pool pad equipment. Further, network connected external sensing devices such as flow meters, flow switches, temperature sensors, TDS sensors, pH sensors, etc. can communicate sensed data to the pump 100 via wired or wireless communication, and the pump 100 can communicate the sensed data to a server or the remote user device 380. Accordingly, the pump 100 can effectively act as a control hub and a communication hub for the pool pad devices and any related external sensors.

For example, in some forms, the pump 100 can include logic to control, through the onboard controller 134 or the remote device 380, a pool lighting assembly. The pump 100 can transmit instructions to the lighting assembly to dictate when and how the lighting assembly is illuminated, such as days of the week, times of day, duration of illumination, pattern of designs, colors, or animation types. Similarly, the pump 100 can include logic to control a salt chlorine generator, chlorinator, or other chemical dispensing system such as the days of the week and times of day the salt chlorine generator is activated.

Next, the pump 100 can receive sensor data transmitted from a water quality monitor, such as a water quality monitor that can measure temperature, oxidation reduction potential (ORP), and pH. Further, the pump 100 can use the received ORP, pH, and temperature values sensed by the water quality monitor to change the operating functions of the pump 100 itself or the operation of other pool pad equipment. For example, in response to the received water quality monitor sensor data, the pump 100 can change the flow rate, pump speed, and timing, such as time of day, frequency, and length of time, that the pump 100 is operated. Further, the pump 100 can instruct a device to inject muriatic acid into the pool. The pump 100 can also transmit the received water quality monitor sensor data to a server or the remote device 380 for aggregation and analysis.

In another example, the pump 100 can include logic to control water features, fountains, or valves within the pool circulation system. Accordingly, the pump 100 can transmit instructions to the water features, fountains or valves to turn on or off, open or close, dispense water in a plurality of designs, and/or follow a particular schedule of operation during particular days or times. In some instances, the pump 100 can transmit instructions to operate certain water features, fountains or valves in coordination with the operation schedule of the pump 100.

In another example, the pump 100 can include logic to control a heater for the pool. Accordingly, the pump 100 can transmit instructions to the heater to heat the water to a particular set point, turn on or off, or run on a particular schedule of days and times. The pump 100 can also transmit instructions to control the operation of the heater in response to temperature sensed by the pump 100 itself, a temperature sensed by the heater, or a temperature sensed by another network connected external temperature sensor such as the temperature sensor provided with the water quality monitor discussed above. The pump 100 can also control the flow dependency of any or all pool pad equipment and external sensor devices, thus deactivating or activating the pool pad equipment, or external sensor devices based on whether the pump 100 is currently pumping water through the circulation system.

All of the aforementioned functions and instructions transmitted by the pump 100 can be initiated by way of user input at the onboard controller 134 or the remote device 380. Further, any or all of the physical buttons 300, the touchscreen display 316, the automation device 176, the mid-level automation device 180, and the remote user device(s) 380 may enable a user to manage virtual computing resources allocated to an account setup by the user and be configured to implement an IoT platform for the pump 100.

Figure 6A:
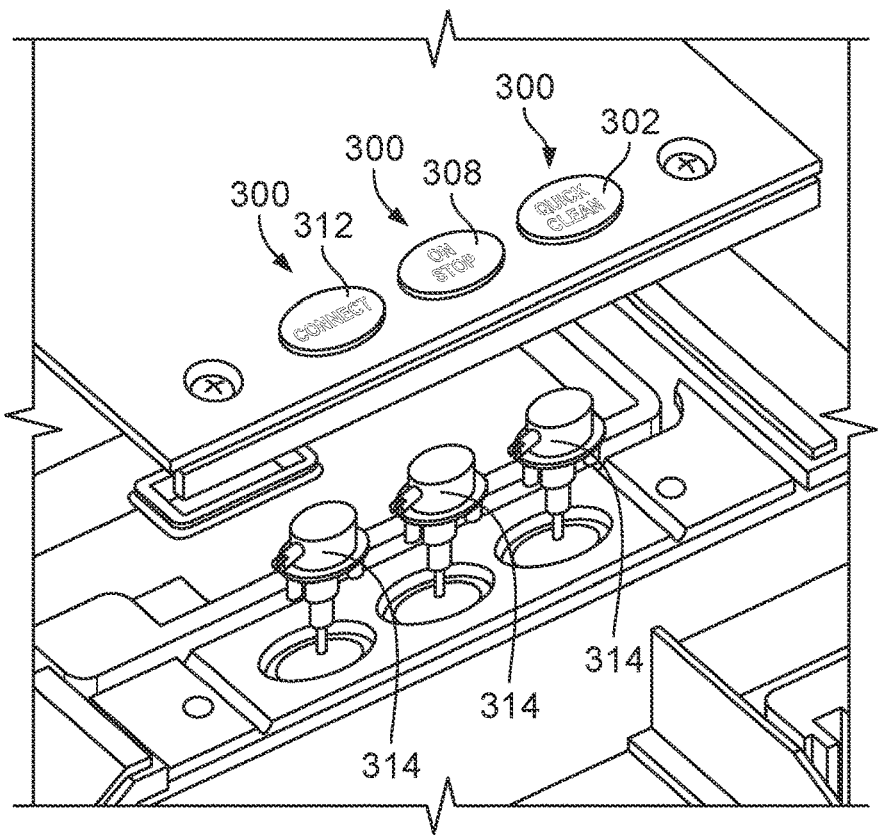
FIG. 6A is a partial exploded isometric view of the pump of FIG. 1.
Figure 6B:
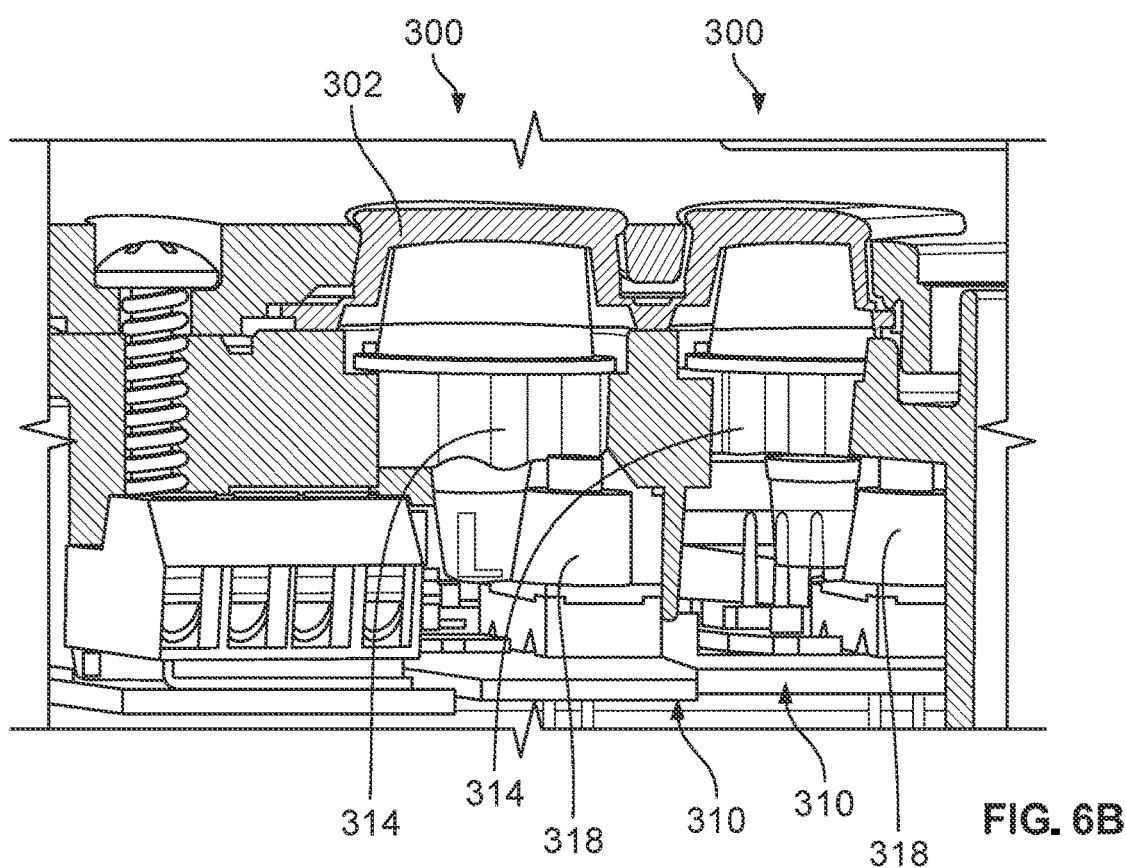
FIG. 6B is a partial cross-sectional view of the pump of FIG. 1.

As illustrated in FIGS. 6A and 6B, in the simplest form, the onboard controller 134 of the pump 100 can be controlled via one or more on-board physical buttons 300. As such, the pump 100 can be controlled in a local mode without any network connectivity or communication with other devices. In FIGS. 6A and 6B, three on-board physical buttons 300 are depicted. The buttons 300 can each be provided in the form of a force tactile button or any other touch-based button configuration known in the art. A low compression button overlay seal 302 can be provided on the buttons 300. The overlay seal 302 can be positioned between the outside environment and an actuating portion 310 of each of the buttons 300 such that the electrical circuitry beneath the buttons 300 can be protected from water entering the pump 100 through the buttons 300. Each actuating portion 310 can include a button-shaped light pipe 314 for directing light up from under-button lighting, and an actuator 318.

The buttons 300 can simplify the options and provide basic functionality such as power on/off, and can provide one or more pre-programmed functions for the pump 100. For example, a quick clean button 304 can be provided which runs the pump 100 at a user configurable speed for a user configurable amount of time, such as 1 hour. High and low speed buttons can be provided to allow for selection between continuous operation at a preprogrammed or manually selected high or low speed until another selection is made, such as power off with a power on/off button 308. The on-board physical buttons 300 can also assist with connecting the pump 100 to other devices in a network to provide additional user interface control options. For example, the physical buttons 300 can include a network connection button 312, which can be pressed during a network connection process by which the pump 100 is wirelessly connected to a Wi-Fi network, a peer-to-peer network, cellular network or other wireless network as described above.

One or more of the buttons 300 can include one or more LED lights, which can be provided in a variety of colors. In some forms, the LEDs illuminate in different colors and patterns to indicate conditions of the pump 100. To name a few non-limiting examples, each button 300 can have an associated green, blue, orange, and red LED, and each of the LEDs can illuminate as a solid continuous light, a pulsing light, or a blinking light in predetermined orders or combinations. Accordingly, the combination of color and illumination pattern can be associated with a particular condition of the pump 100. For example, various light and pattern combinations illuminated underneath the network connect button 312 can include: a green pulsing light indicating that Wi-Fi is connecting; a solid continuous green light indicating that Wi-Fi has successfully connected; a blinking blue light indicating that a Bluetooth device is pairing; a solid continuous blue light indicating that the Bluetooth device has successfully paired; a pulsing orange light indicating that wireless provisioning is needed; and a blinking orange light indicating that the software is updating.

Another example includes the power on/off button 308 illuminating as follows: a solid continuous green light indicating that the pump 100 is running; a blinking green light indicating that the pump 100 is priming; a pulsing green light indicating that the pump 100 is in a thermal mode; a solid continuous red light indicating that the pump 100 is disabled; a red blinking light indicating one or more alarms are active; and a simultaneous and continuous orange and green light indicating a warning.

Figure 7B:
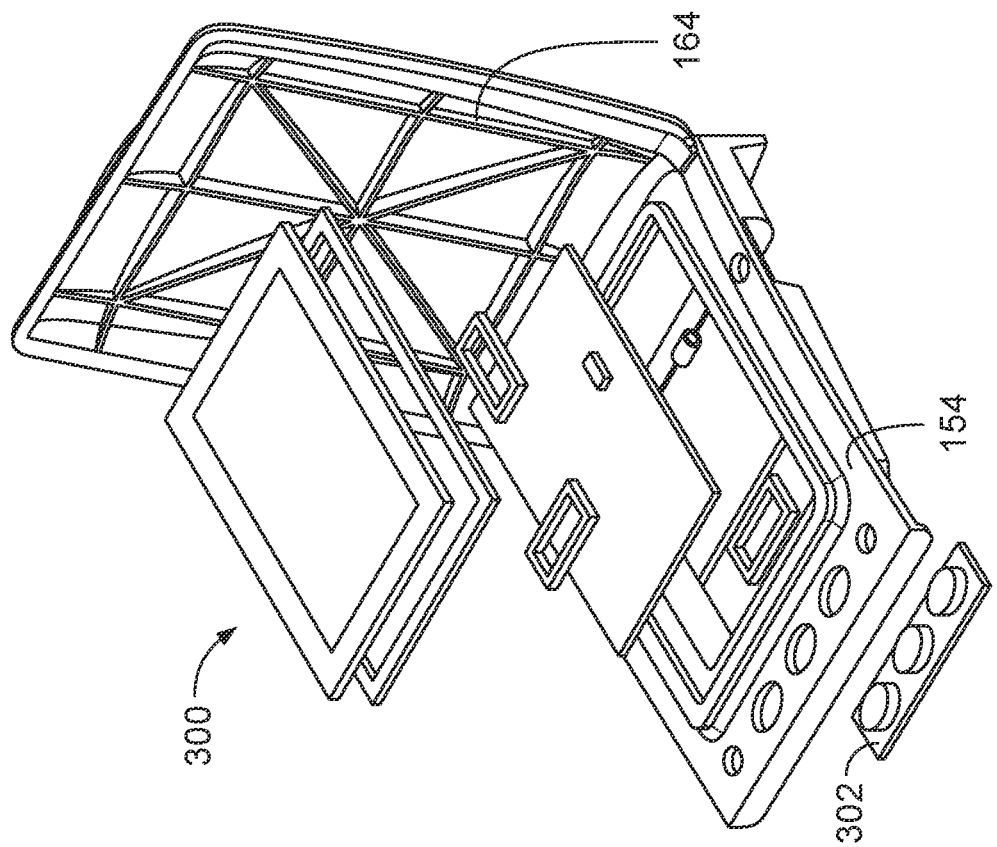
FIG. 7B is an exploded isometric view of the touchscreen of FIG. 7A.
Figure 7A:
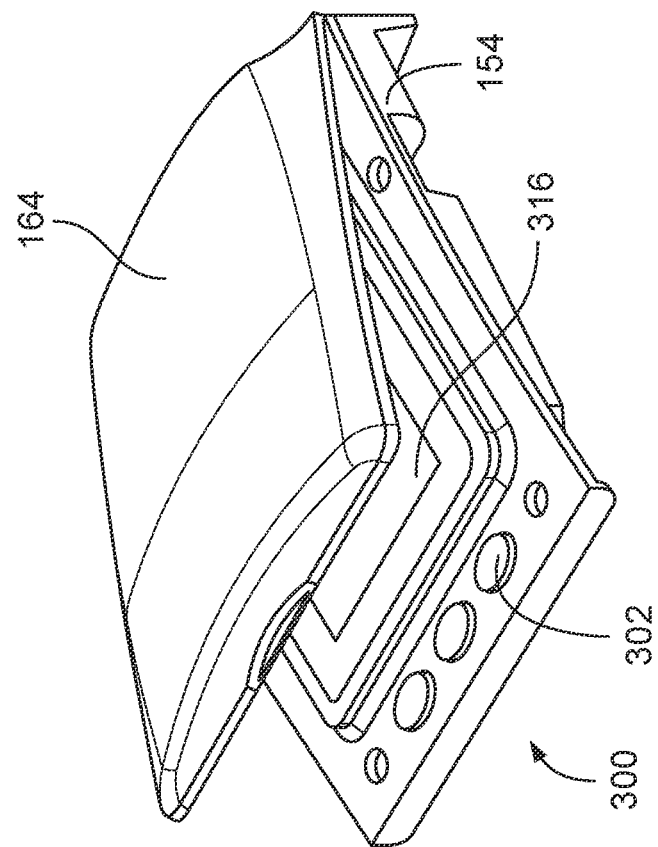
FIG. 7A is an isometric view of a touchscreen of the pump of FIG. 1 with a user interface cover in a partially closed orientation, removed from the pump housing.

Referring to FIGS. 7A and 7B, in some forms, the onboard controller 134 can be provided in the form of the touchscreen display 316 in place of, or in addition to, the buttons 300. The touchscreen display 316 can be provided as a capacitive touch display disposed under the rotatable cover 164. For example, the capacitive touch display can include an interface that provides for increased pump speed as the user swipes their finger across the screen. Further, as the user swipes their finger, a series of rectangular columns adjacent one another, and increasing in size from left to right, can light up correspondingly to the location of the user's finger and the increase of pump speed correlated to the location of the user's finger. In some embodiments, the onboard controller 134 includes a visual or optical sensor such as a camera or infrared sensor that can detect movement. Accordingly, the onboard controller 134 can receive commands through movement or gesture recognition. For example, pointing upward can increase the flow rate of speed of the pump 100, and pointing downward can decrease the flow rate or speed of the pump 100.

In some forms, the touchscreen display 316 can be sized between about 3 inches and about 8 inches. Upon powering on the pump 100, the touchscreen display 316 can display, and provide access to, a virtual environment stored in the software of the main circuit board 228. In some embodiments, the touchscreen display 316 can be selectively removable and mountable in a remote location, such as a nearby wall, and coupled to the main circuit board 228 by a cable to deliver power and provide communication. When the touchscreen display 316 is mounted in a remote location, a cover plate can be attached to enclose the space in the housing of the pump 100 created by removing the touchscreen display 316.

Figure 8A:
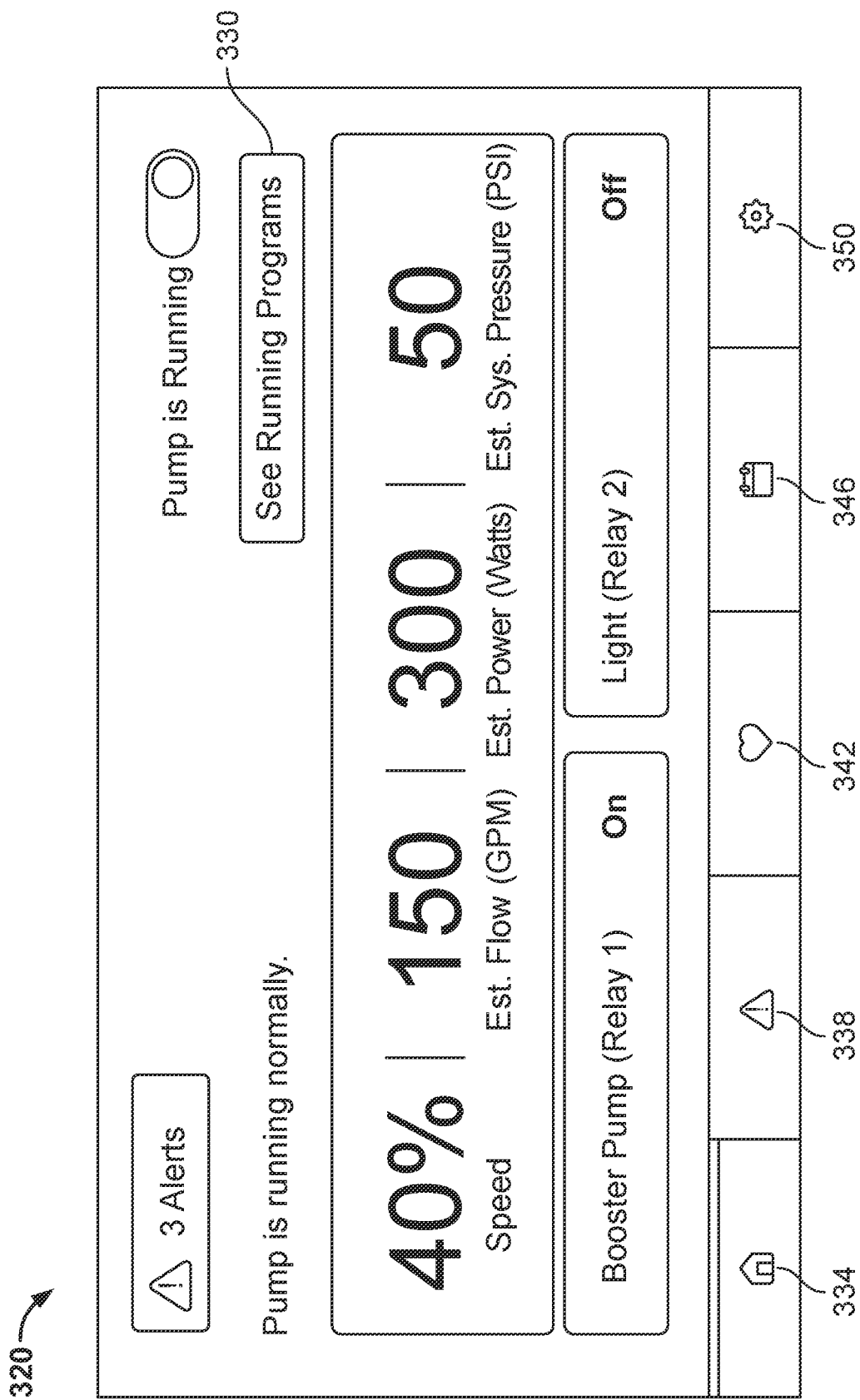
FIG. 8A is an onboard dashboard display on the touchscreen of FIG. 7A.

As shown in FIG. 8A, an onboard dashboard screen 320 of the virtual environment can be provided as the first level of navigation for the user on the touchscreen display 316. The onboard dashboard screen 320 can include a variety of modules with which the user can interact and a variety of modules that display information to the user. For example, the onboard dashboard screen 320 can display the current pump speed, estimated pump flow rate value, estimated pump power consumption value, estimated system pressure value, system head pressure, alert statuses, and the status of any auxiliary device 174 that is electrically connected to the pump relay terminal blocks 196. The current pump speed, estimated pump flow rate value, estimated pump power consumption value, estimated system pressure value, system head pressure, total dynamic head, and other similar values can be determined by the drive 130. For example, the drive 130 can monitor a power consumption value of the motor 110, and use the power consumption value, along with known pump characteristics from pump performance curves (see FIGS. 23, 24), to estimate pump power consumption over a period of time, estimate the current system pressure, estimate the total dynamic head, and estimate the pump flow rate.

These values can be displayed in a variety of forms as set by the user. For example, the pump speed can be displayed in RPM or as a percentage of a maximum pump speed; the estimated flow value can be displayed in gallons per minute (GPM), liters per minute (LPM) or a percentage of the maximum pump flow; the estimated power consumption value can be displayed in watts or horsepower; and the estimated pressure value and/or system head pressure can be displayed in pressure per square inch (PSI) or kilopascals (kPa). The example value types are understood to be non-limiting, and that any of the aforementioned values can be displayed in the form of any unit or measurement appropriate to convey the value to a person of skill in the art. The touchscreen display 316 can also be configured such that the screen is orientated in either landscape or portrait format to accommodate the user's preference and the position of the pump 100 on the pool pad.

In some forms, the onboard dashboard screen 320 provides a plurality of user selectable modules to navigate throughout the virtual environment. For example, the onboard dashboard screen 320 can include a running programs module 330, a home button module 334, an alerts module 338, a favorite programs module 342, a pump schedule module 346, and a device settings module 350. In some forms, any or all of the modules 330, 334, 338, 342, 346, and 350 can be accessible/displayed/selectable by the user from any point of navigation through the virtual environment.

Figure 8B:
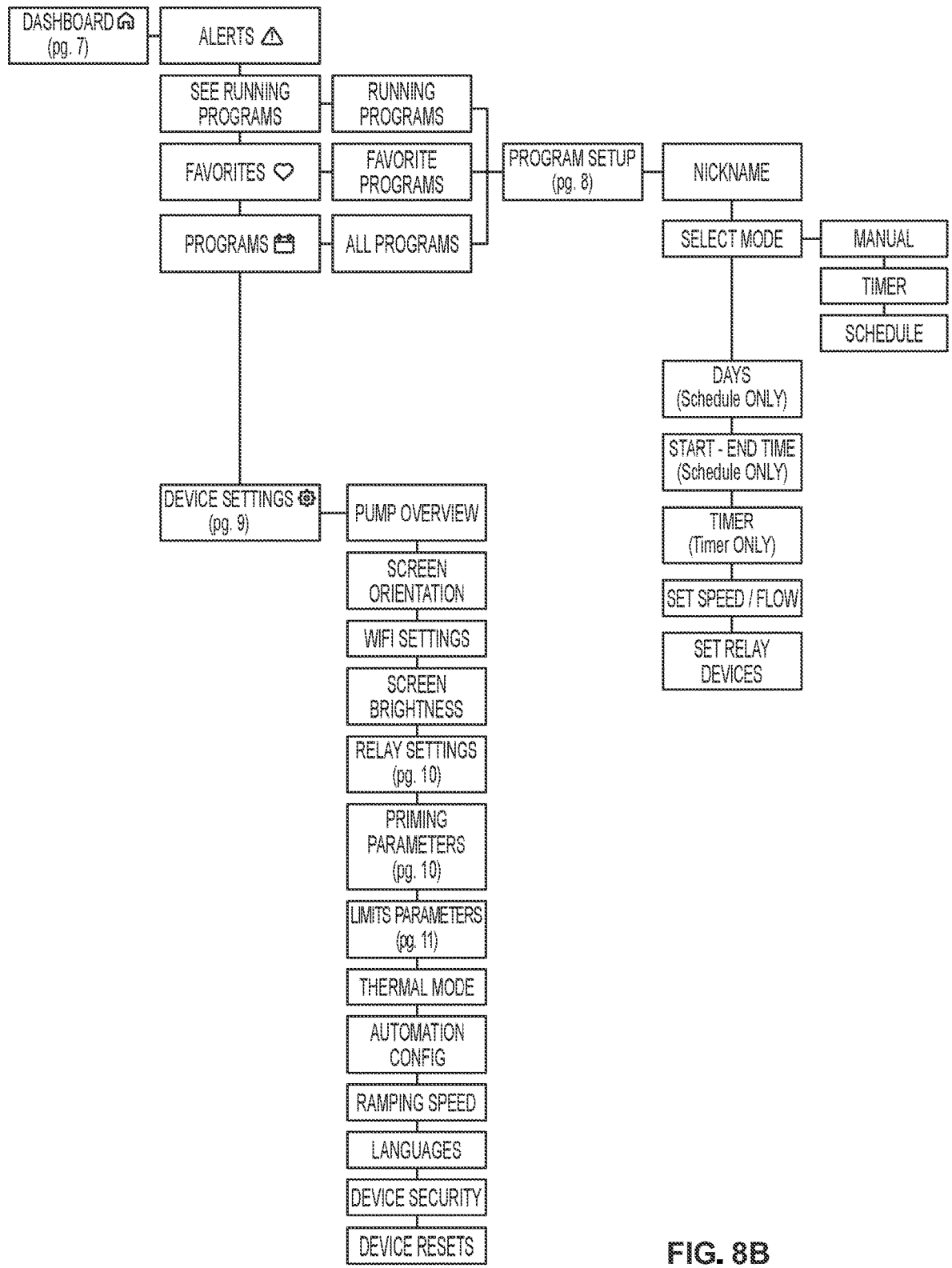
FIG. 8B is a schematic diagram of a navigation tree of the onboard dashboard display of FIG. 8A.

FIG. 8B illustrates a touchscreen menu tree associated with the onboard dashboard screen 320. Several of the virtual environment navigation screens are described further below. From the onboard dashboard screen 320, the alerts module 338, the running programs module 330, the favorites module 342, pump schedule module 345 ("programs"), and the device settings module 350 can be accessed. Each of the running programs module 330, favorite programs module 342, and program schedule module 345 can lead the user toward a program setup screen, where various aspects of pump programs can be modified, such as the nickname for the program, the mode of the program (Manual, Timer, Schedule), the days and times that the pump 100 operates due to the program, whether the program is speed or flow controlled, what speed or flow rate the pump 100 will be controlled at, and whether various auxiliary devices 174 will be activated by the relays 198. From the device settings screen, the pump overview can be accessed, the screen orientation can be modified between landscape and portrait, wi-fi settings can be accessed, screen brightness can be modified, relay settings can be modified with respect to the auxiliary devices 174, a priming parameters module 366 can be accessed, a limits parameters module 370 can be accessed, a thermal mode can be modified, automation device 176 can be configured with the pump 100, ramping speed can be configured, language of the onboard controller 134 can be set, and device security and resets can be modified.

Figure 9:
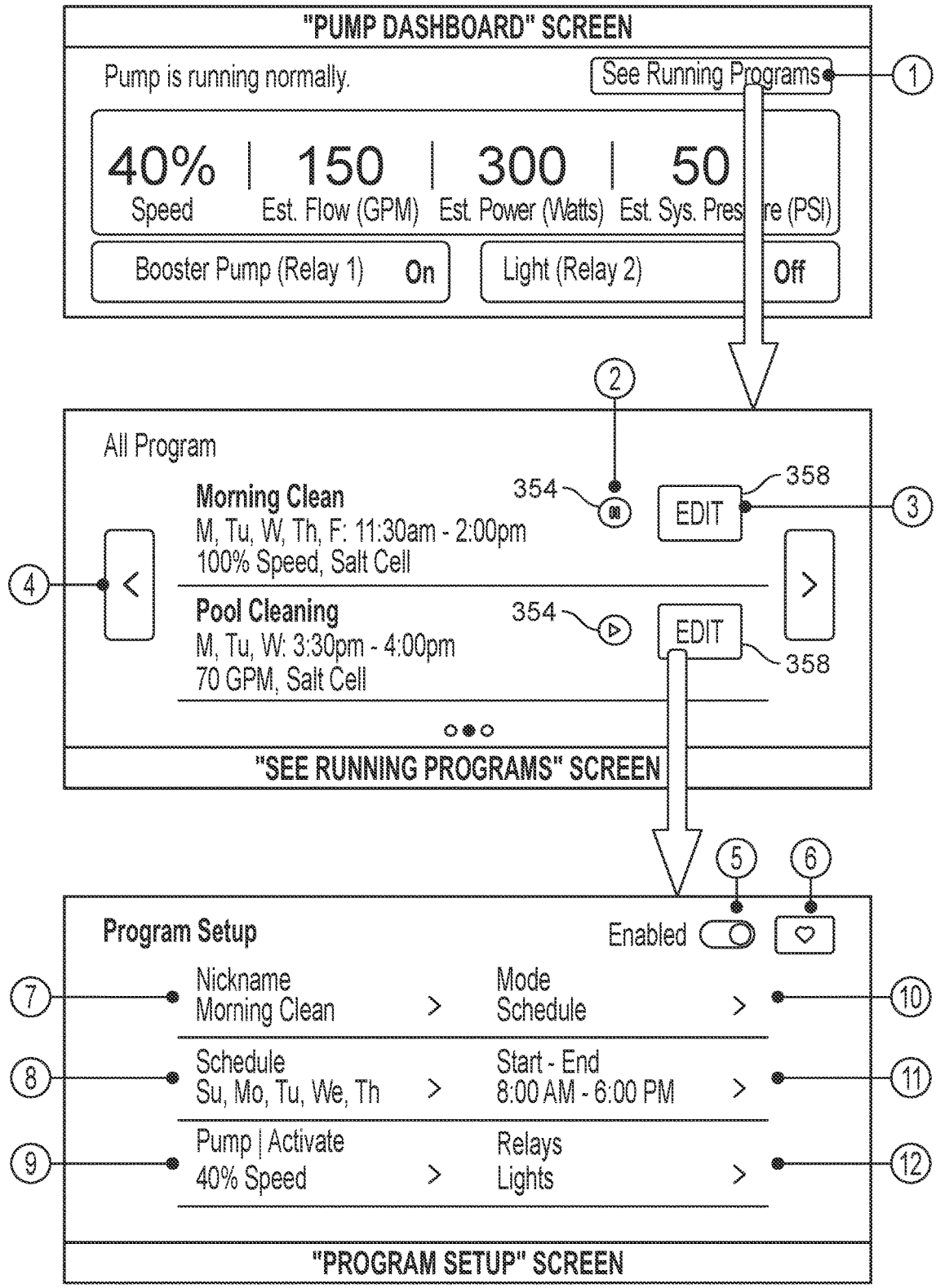

FIG. 9 illustrates a virtual environment navigation example with respect to the running programs module 330. When the user presses the running programs module 330 on the touchscreen display 316, the touchscreen display 316 displays a list of user-programmed pump operation programs 322 that are currently available for activation e.g., each program will run according to its corresponding programming (time, speed, flow rate, etc.) if activated. In some embodiments, the pump 100 is preloaded with a standard pump operation program, or standard/specialized pump operation programs 322 can be pushed wirelessly to the onboard controller 134 from a remote user device 380 by a pool service professional, or from a server through an automatic, over-the air update.

In some forms, each of the pump operation programs 322 are displayed along with a user-selected title such as "Morning Clean", the days of the week that the program runs, the time of day the program runs, the pump speed or flow rate at which the pump 100 operates, and a short description of any auxiliary device 174 electrically connected to the pump relay terminal blocks 196 that is scheduled to be activated during activation of any particular operation program 322. Accordingly, various auxiliary devices 174 can be associated with various pump schedules, and in some forms, two or more auxiliary devices 174 can be configured to be active at the same time. From the list of pump operation programs 322, each of which may be immediately visible or the user can scroll on the page if the number of operation programs 322 exceeds the space on the touchscreen display 316, the user can turn on or off any of the operation programs 322 by selecting an ON/OFF button 354 associated with any particular operation program 322. The ON/OFF button 354 can be presented as a green circle with a play button symbol when the operation program 322 is not active, indicating that the user can press the green circle to activate the operation program 322. The ON/OFF button 34 can also be presented as a red circle with a pause symbol when the operation program 322 is active, indicating that the user can press the red circle to deactivate the operation program 322.

The user may also navigate within the virtual environment to edit each individual operation program 322 by clicking on, for example, an "edit" button 358. If no operation programs 322 have yet been set-up by the user, the user may also select an option that navigates to another setup screen to input a new program. After selecting the "edit" button 358, or when setting up a new operation program 322, the user can configure any of the individual parameters of that existing or new operation program 322. For example, the user can change the nickname, the days of the week for activation, the pump speed or flow rate, the time of day for activation, a manual, schedule, or timer mode (described further below), and which, if any auxiliary devices 174 will be activated for the given operation program 322. Once the desired programs have been created, the user can navigate back to the onboard dashboard screen 320 using the home button module 334.

Referring back to the onboard dashboard screen 320, the user can select the device settings module 350 to configure various aspects of the controller 134 itself, view the network connectivity status of the pump 100, or view other information related to the pump 100. For example, after selecting the device settings module 350, the user can be offered options to: view general information about the pump 100 such as a nickname, address, or software information; select a screen orientation preference for how the virtual environment is displayed on the touchscreen display 316; view Wi-Fi network connectivity information and signal strength; configure the brightness of the touchscreen display 316; configure dimming and timeout settings for the touchscreen display 316; view and edit information relating to auxiliary device 174 that is electrically connected to the pump relay terminal blocks 196; view and edit pump priming parameters; view and edit limits for the operation of the pump 100 based on speed, flow, pressure, and the like; view and edit a thermal mode to protect the pump from freezing; view and edit address information associated with the automation device 176 if connected; configure the ramp-up speed rate of the pump 100 (e.g. fast, medium, slow); and/or select any language preferences for the touchscreen display 316.

Figure 10:
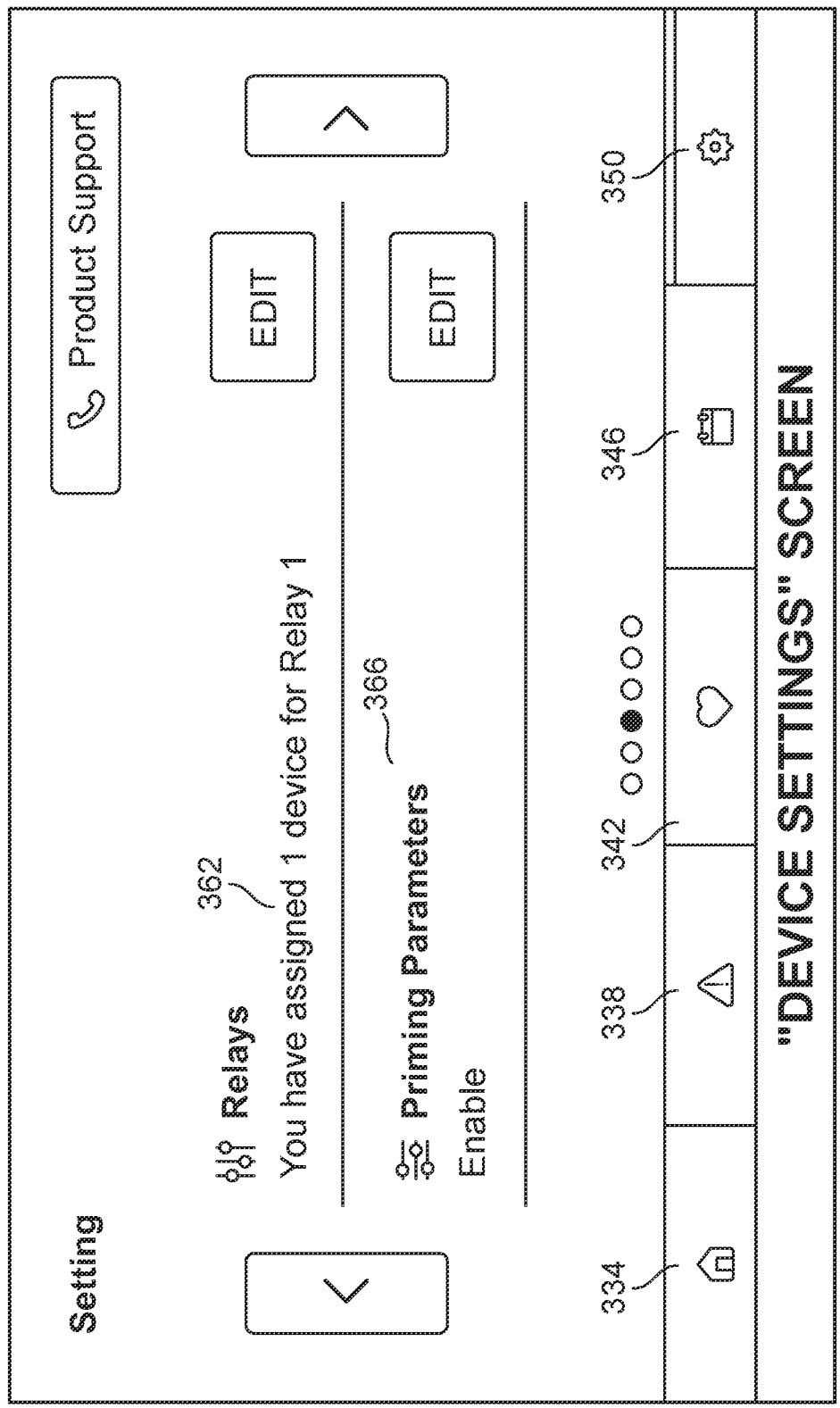
Figure 11:
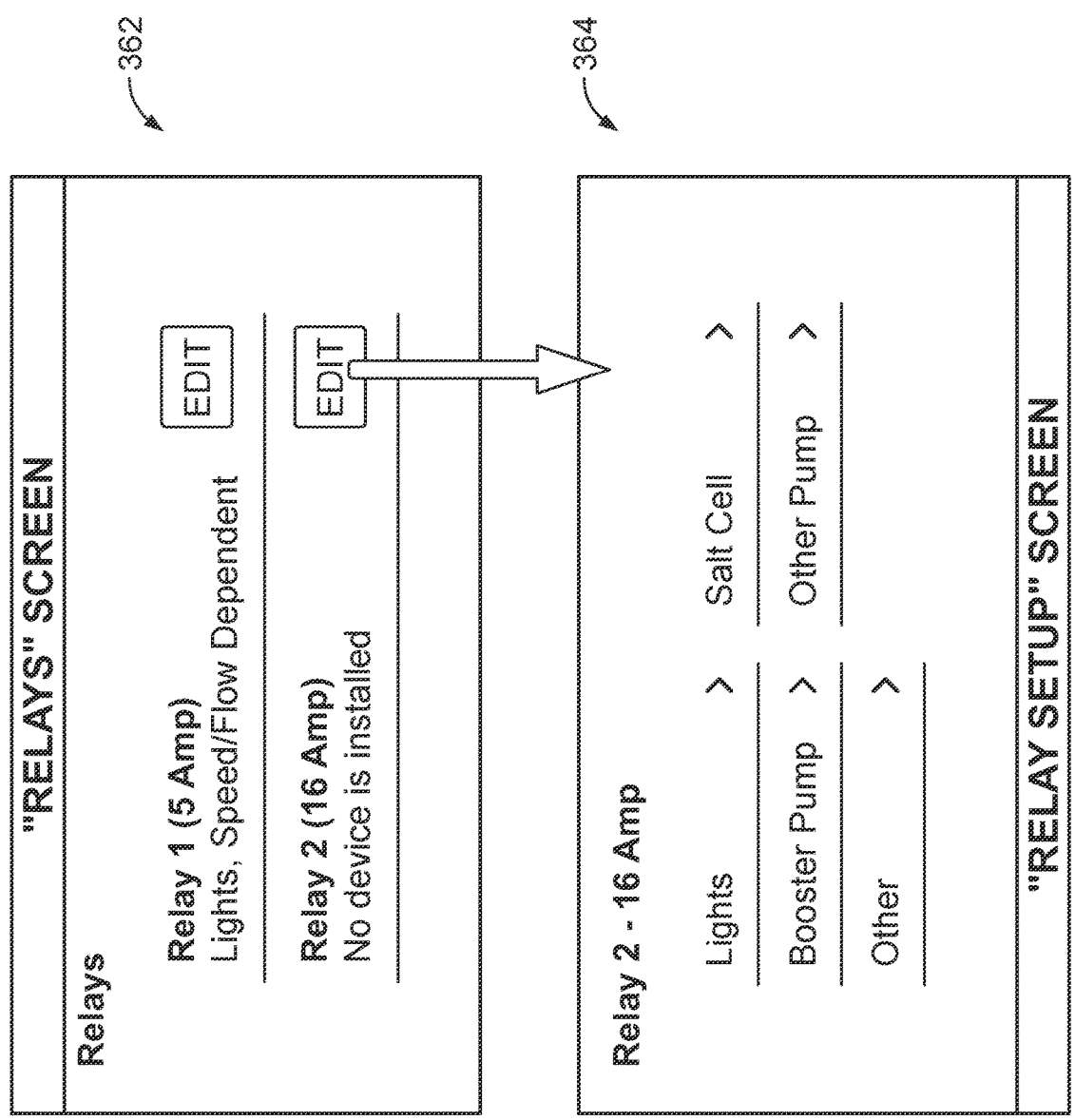

FIG. 10 illustrates an example navigation display after selecting the settings module 350. The display shown in FIG. 10 includes at least a relay module 362 and a priming parameters module 366. From FIG. 10, users can navigate to a relay setup screen 364 as shown in FIG. 11 by selecting the relay module 362. From the relay setup screen 364, users have the option to identify any auxiliary device 174 that is electrically connected to the pump relay terminal blocks 196. In particular, as mentioned above, one of the relay terminal blocks 196 can be designated to provide a higher amperage than the other one or more pump relay terminals 196. For example, one of the relay terminals 196 can be configured to deliver up to about 5 amps while another of the relay terminals 196 can be configured to deliver up to about 16 amps. Thus, from the relay setup screen 364, the user can designate which auxiliary device 174 is electrically connected to the 5 amp relay terminal block 196 and which auxiliary device 174 is electrically connected to the 16 amp relay terminal block 196.

Examples of such designation options for the auxiliary devices 174 includes designating the auxiliary devices 174 as one of a lighting assembly, a salt chlorine generator, a water quality monitor, a booster pump, a single speed pump, a chlorinator, a pool vacuum, a water feature, a fountain, a heater or a placeholder "other", which can be any auxiliary device 174 that is electrically compatible with the relay terminal block 196 to which it is connected. The options of auxiliary devices 174 can be displayed and selected via the onboard dashboard screen 320. The user can also designate a nickname to any of the auxiliary devices 174 for easy identification during system programming. Further, the user can designate whether any given auxiliary device 174 is speed or flow dependent, and, thus, should not be powered when no volumetric water flow is being delivered through the pump 100 or the pump 100 is not running. In some forms, a minimum pump speed or flow rate can be assigned to the activation of a particular auxiliary device 174 such that the auxiliary device 174 can only be activated when the pump 100 is operating above a certain speed or flow rate. In some instances, the auxiliary device 174 will be deactivated when no water flow is being delivered or the flow rate decreases below a threshold flow value.

FIGS. 12A and 12B illustrate additional navigation displays that can be reached after selecting the settings module 350. From the settings display shown in FIG. 10, the priming parameters module 366 can be selected to reach a priming parameters display 366 as shown in FIG. 12A. On the priming parameters display 366, the user can configure settings for the pump 100 such as whether a priming operation is enabled or disabled, the priming speed of the pump 100 at which the pump 100 will run during a priming operation, the maximum time duration of the priming operation that the pump 100 will attempt to achieve prime, the sensitivity of priming detection (e.g. lower settings require higher flow to detect successful priming completion), the priming delay time during which the pump remains at a priming speed before transitioning to a selected operation program 322, and enabling or disabling a loss of prime detection to detect low-flow or no-flow during the operation of the pump 100 such that the priming operation is initiated.

FIG. 12B illustrates the selection of a limits parameters module 370 from the settings display shown in FIG. 10. Because the settings display of FIG. 10 includes more modules than can be displayed based on the limitation of the size of the touchscreen display 316, the user may need to use a scrolling feature while in the settings display to reach the limits parameters module 370. Once the limits parameters module 370 is selected the user can configure a number of settings including but not limited to: the minimum and maximum pump speed limits, the minimum and maximum flow rate limits, whether speed-based operation programs 322 will be limited by the minimum and maximum flow rate limits, the minimum and maximum pressure limits, and whether speed-based operation programs 322 will be limited by the minimum and maximum pressure limits.

With respect to the alerts module 338, a variety of alerts can be provided to the user in visual, audio, or other forms including, but not limited to, an alert corresponding to the thermal mode being active (to prevent pump freeze), an overheat condition associated with any of the components of the pump 100, an overcurrent, overvoltage, or undervoltage condition associated with any of the electrical components of the pump 100 such as the drive 130, a pump speed limit, a pump pressure limit, a flow limit, a priming failure, a weak Wi-Fi connection, the pump 100 being offline, a communication error, or an internal error associated with the power supply and/or a power factor correction circuit in electrical communication with the power supply of the pump 100. It is to be understood that along with the alerts module 338 of the touchscreen display 316, any of the aforementioned alerts can also be displayed in various ways by any of: the physical buttons 300 located on the pump 100 itself; the touchscreen display 316; the automation device 176; the mid-level automation device 180; the remote user device 380; or via any notification method selected by the user such as email or text notifications to a mobile phone. Any of the thresholds associated with the alerts for the pump 100 can be programmed into the software of the onboard controller 134. Alternatively, some of the thresholds associated with alerts can be based on hardware limitations associated with the pump 100.

As mentioned above, the onboard controller 134 can wirelessly (or in a wired configuration) be connected to an IOT device within a network, including the remote user device 380 (see FIG. 5). Accordingly, FIGS. 13-21 illustrate various screens from a virtual environment of the remote user device 380 that provide IoT capabilities for the pump 100. It should be noted that the virtual environment of the remote user device 380 can be configured to be substantially similar to the virtual environment of the onboard controller 134. Thus, all of the description and functionality provided above with respect to the onboard controller 134 is incorporated herein with respect to the remote user device 380. Accordingly, the remote user device 380 can functionally provide the same alerts, displays, visuals, and control functions of the pump 100 as the onboard controller 134.

Figure 13:
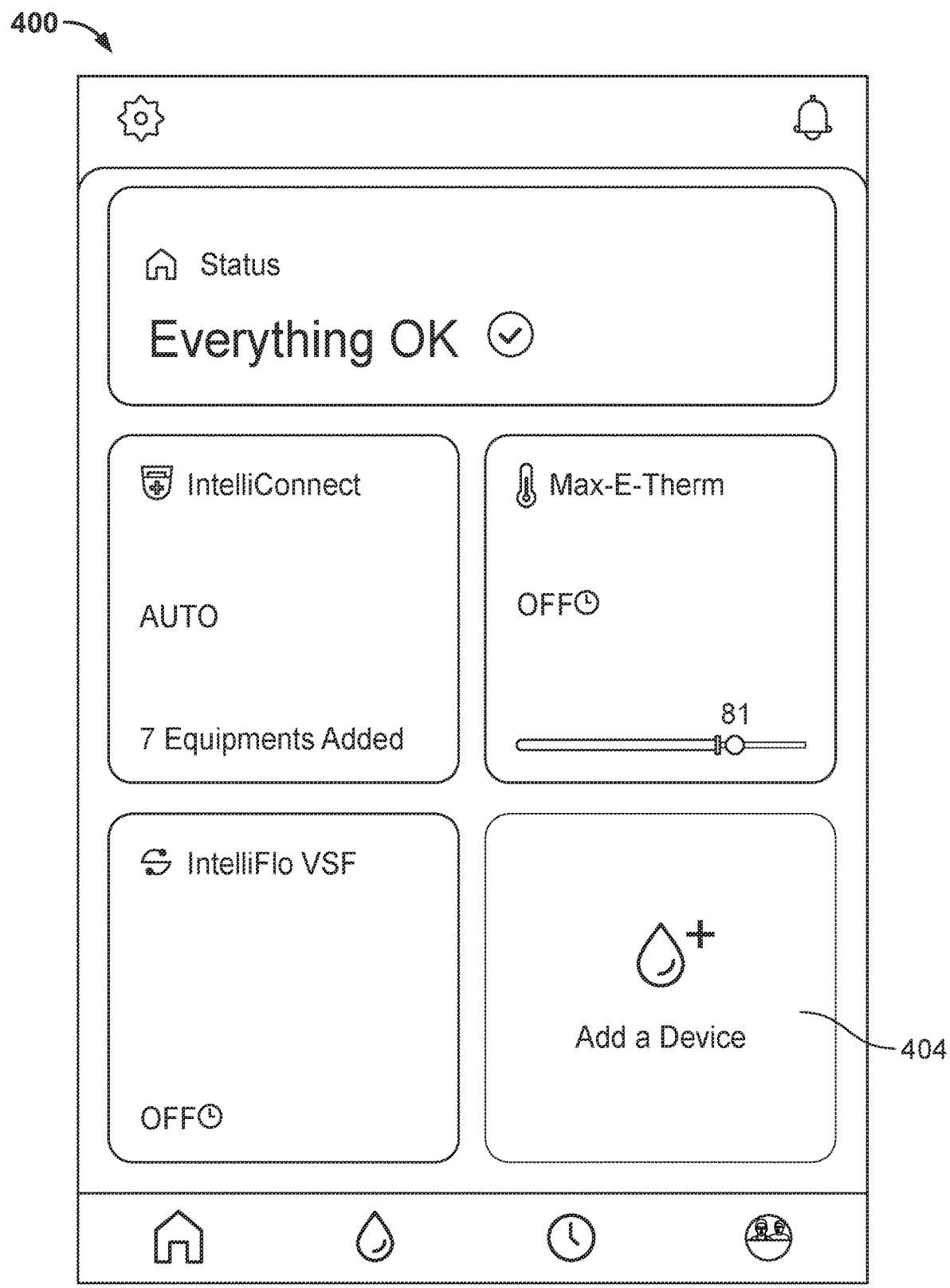
FIG. 13 illustrates a remote dashboard display from a virtual environment of a remote device.

FIG. 13 illustrates a remote device home screen 400 through which the user can control multiple networked devices. Also, because the remote user device 380 and the onboard controller 134 can be in communication with and connected to the same network, each of the remote user device 380 and the onboard controller 134 can reflect any changes in the control of the pump 100 made on either device. Further, the remote user device 380 is configured to transmit instructions to the onboard controller 134 to be carried out by the onboard controller 134, such as to control the flow rate or speed of the pump 100, or to activate any auxiliary device 174. Any and all updates from the remote user device 380 can be transmitted to the onboard controller 134 and the pump operation schedule can be updated and/or the activation schedule of the auxiliary devices 174 can be updated.

Figure 15:
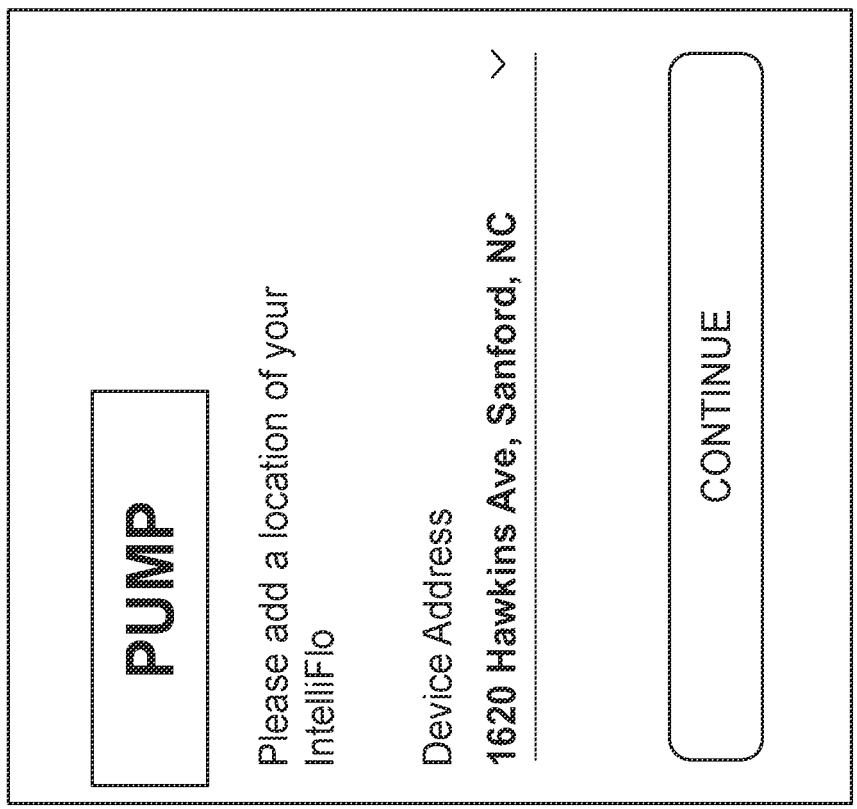
Figure 14:
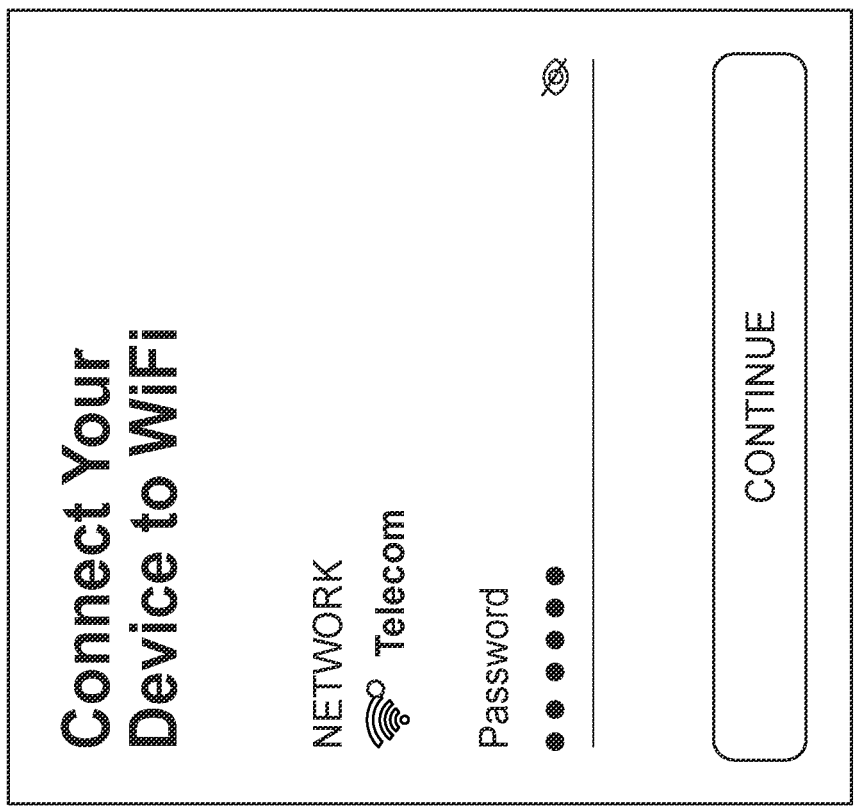

To establish a wireless connection between the remote user device 380 and the pump 100, the user can select the device adding module 404. Once the device adding module 404 is selected, the remote user device 380 will navigate to a screen where the user can select a virtual representation of the pump 100. The user can select the virtual representation of the pump and then press the network connection button 312 on the pump 100 to begin pairing the pump 100 with the remote user device 380. LED lights below the network connection button 312 will indicate to the user the status of pairing as mentioned above. Based on the color and pattern of the network connection button 312, the user can determine the success of the pairing function and select a confirmation button on the remote user device 380 accordingly. Thereafter, the remote user device 380 will be paired via Bluetooth to the controller 134 of the pump 100. Next, as shown in FIG. 14, the user can enter network credentials via the remote user device 380 to configure the controller 134 to be able to connect to a Wi-Fi network when the pump 100 is powered on. As shown in FIG. 15, the user can indicate the geographical address where the pump 100 is installed.

Figure 16:
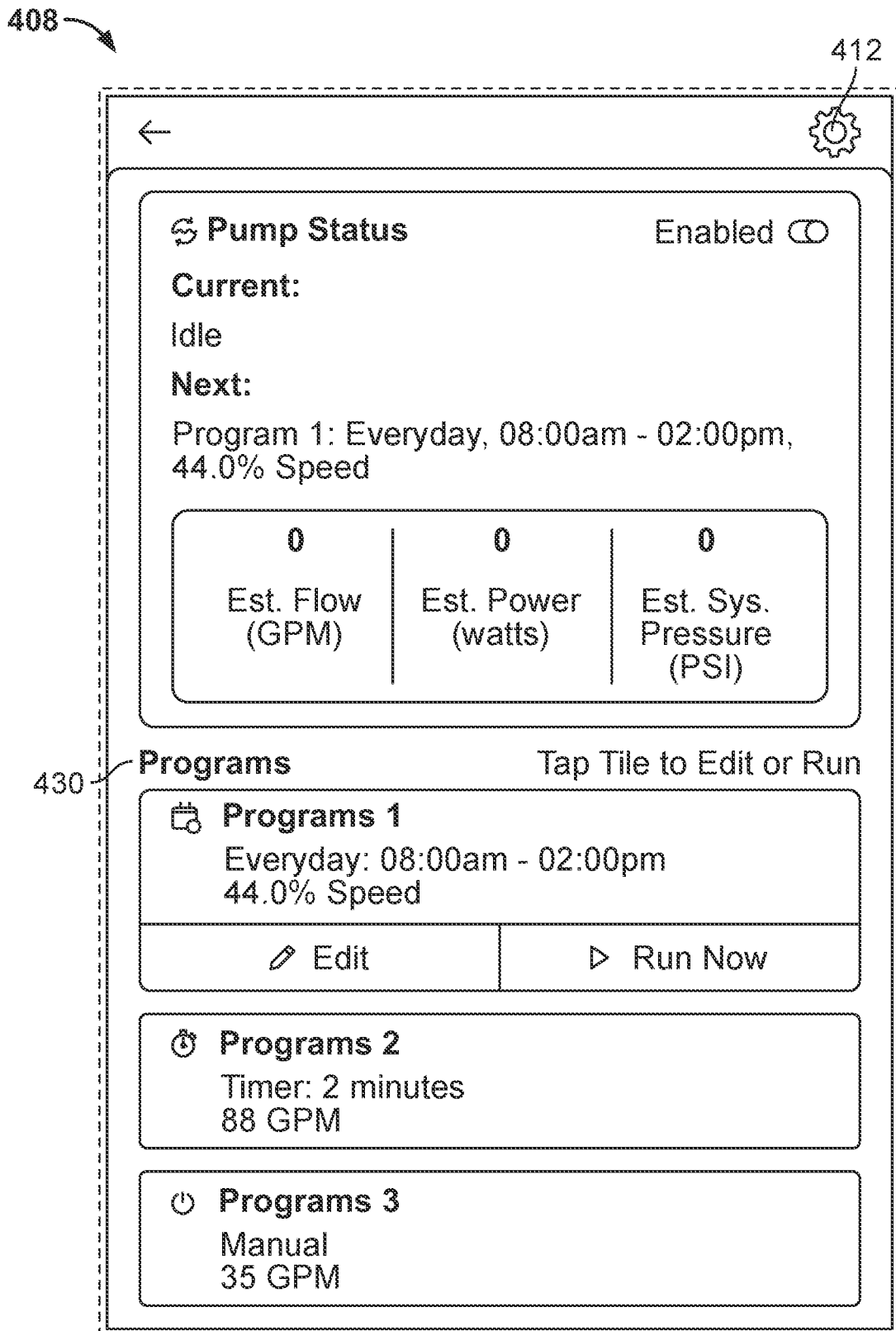

FIG. 16 illustrates a remote device dashboard 408 of the remote user device 380, which can provide substantially similar displays and controls of the pump 100 as the onboard dashboard screen 320 on the touchscreen display 316. For example, the remote device dashboard 408 can display pump speed, estimated pump flow, estimated power consumption value, estimated system pressure, alert statuses, and the status of any auxiliary device 174 that is electrically connected to the pump relay terminal blocks 196. In some forms, the remote device dashboard 408 includes a remote device settings module 412 and a remote running programs module 430. As shown in FIG. 16, the remote running programs module 430 can display the list of user-programmed pump operation programs 322 that are currently available for activation e.g., each program will run according to its corresponding programming (time, speed, flow rate, etc.) if activated. In some forms, each of the pump operation programs 322 are displayed along with a user-selected title, such as "Program 1", the days of the week that the program runs, the time of day the program runs, the speed or flow rate at which the pump 100 operates, and a short description of any auxiliary device 174 electrically connected to the pump relay terminal block 196 that is scheduled to be activated during a particular operation program 322.

Figure 17:
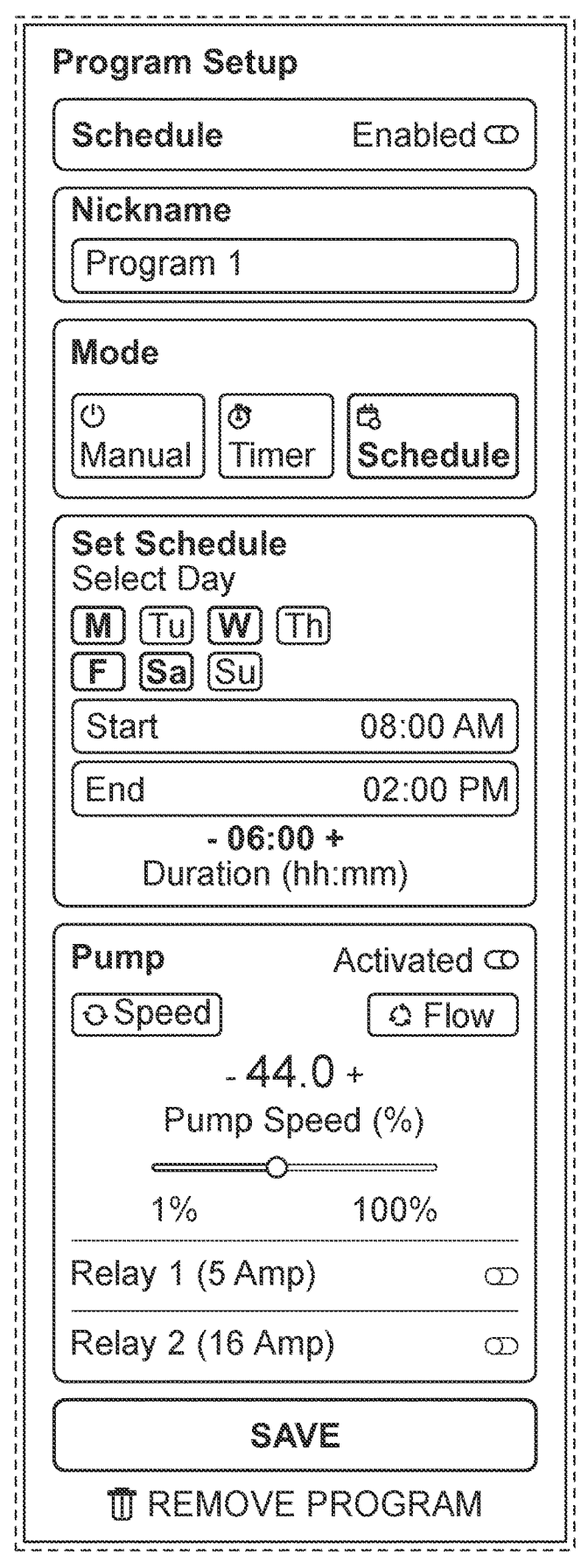

Upon selecting a given operation program 322, the remote user device 380 will navigate to the display screen shown in FIG. 17, where the user can enable/disable the operation program 322, provide a nickname the operation program 322, select the mode of operation (timer, manual, or schedule), select the days of the week that the selected program will run, select the start and end time, select the duration (in hours, for example), select whether the pump 100 will be speed or flow rate controlled, select a precise speed or flow rate at which the pump 100 will be activated, and the option to associate the activation of the pump relays 198 and, consequently, auxiliary devices 174, with the pump operation.

It should be noted that any of these configurable pump settings, or others such language preference, clock configuration, location settings, can be stored at the remote user device 380, at a server, or in the memory unit of the main circuit board 228. Accordingly, if any of the remote user device 380, the server, or the main circuit board 228 experience failure, one of the other still functioning resources can push the configured pump settings to the failed resource upon reboot. For example, if the main circuit board 228 is damaged, crashes, or experiences an unexpected power cycle, the pump settings stored on the remote user device 380 or the server can be downloaded to the main circuit board 228 of the onboard controller 134 once the main circuit board 228 is fixed, replaced, or returned to normal operation.

Figure 18:
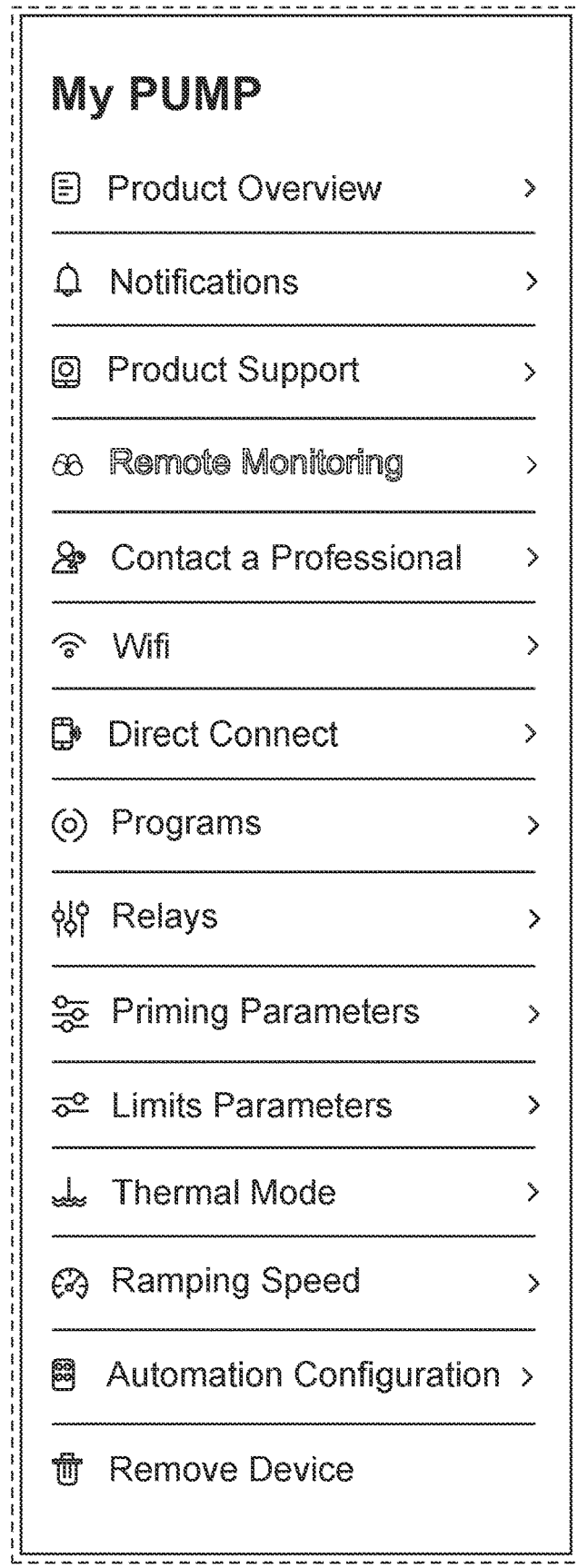
Figure 22:
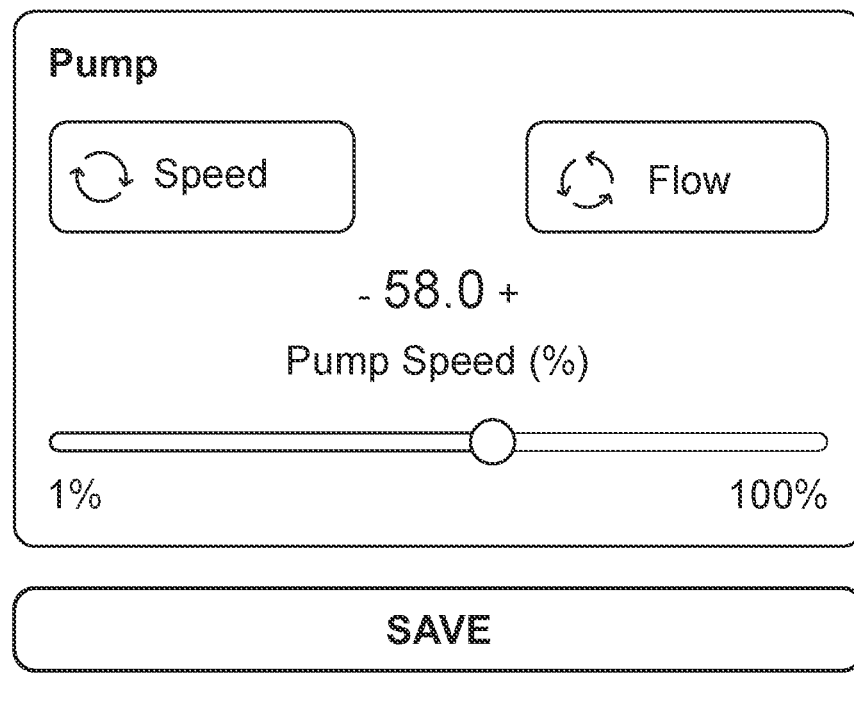

As shown in FIG. 18, a remote device settings display 425 can be provided on the remote user device 380. On the remote device settings display 425, the user can navigate to: a product overview of the pump 100, currently active notifications such as alarms and warnings, product support, a link to contact a professional experienced with the pump 100, Wi-Fi configuration settings, Wi-Fi direct connect settings, the setup page for the operation programs 322, a configuration page for the pump relays 198 (see FIG. 19), a pump priming parameters configuration page (see FIG. 20), a pump limits parameters configuration page (see FIG. 21), a thermal mode page (FIG. 22), a ramping speed page, and/or an automation configuration page to configure any connected automation devices 176 or mid-level automation devices 180. Accordingly, the options of auxiliary devices 174 can be displayed and selected via the remote user device 380, and associated with a pump operation schedule. In some forms, two auxiliary devices 174 can be configured to be active at the same time.

Referring next to the specific functions of the pump 100, the variable speed pump 100 can provide a number of customizable and user controlled functions. For example, any of the operation programs 322 can be configured by the user to run the motor 110 at a percentage of the maximum pump speed setting or at an absolute value of RPM. The pump 100 can also control the speed of the motor 110 based on an estimated flow rate value using one or both of the drive 130 and the onboard controller 134. Accordingly, the pump 100 will maintain a constant flow rate value as set by the user as an absolute value or a percentage of the maximum flow rate setting. For example, the pump 100 can be programmed to deliver between about 20 GPM to about 140 GPM of volumetric water flow. Manual, timer, and schedule modes can be selected for each operation program 322 and eight or more customizable programs can be saved and stored. If a manual mode is selected, the pump with run at the designated speed/flow only when the user manually initiates the operation program 322 and will run indefinitely until the user turns off the operation program 322. If a timer mode is selected, the operation program 322 will only start when the user manually initiates it and will operate the pump 100 at the specific parameters for a set period of time. If the schedule mode is selected, the user has the most customizable control and the operation program 322 will start and end at the set times/day and will operate the pump 100 at the set flow and/or speeds set by the user. If configured, the user can also designate which of the relay terminal blocks 196 will be active while any of the operation programs 322 are running and provide power whenever the pump 100 is operating. In this way, the electrically connected auxiliary devices 174 can operate at the same time as the pump 100.

As briefly mentioned above, the pump 100 can include a user configurable priming function. The priming function runs the pump 100 at a designated speed, usually much higher than normal pump operation, for a specified period of time at the startup of the pump before any of the operations programs 322 are run. Once the pump 100 detects that priming has been achieved (by monitoring power consumption of the drive 130 or through other sensor based methods like a flow sensor) the pump 100 can begin any of the operation programs 322. A delay time can be set between the time that priming is detected to be achieved to the time that the operation programs 322 are initiated. If priming is not achieved within the specified period of time, the pump 100 will power off and an alert will be issued to the user in any of the aforementioned alert methods. In some forms, when priming is enabled, the pump 100 also monitors for a dry run condition during pump operation. Thus, if dry run is detected, for example when a certain power consumption value of the drive 130 is detected for a certain period of time, the pump will be powered off and an alert will be issued. In some forms, the pump 100 will check for dry run regardless of whether the priming function is enabled.

In some forms, the pump 100 is a slave device to the communicatively connected automation device 176. In some forms, the pump is a slave device to the communicatively connected mid-level automation device 180. In this way, the automation device 176 or the mid-level automation device 180 can initiate any of the operation programs 322 as described above. It should be noted that because multiple remote user devices 380 can provide the same functions and allow all of the same configurability as the others, the remote user device 380 can, in some embodiments, also be accessed by a pool service professional to manage, monitor, and control the pump 100 of a customer.

As mentioned above, the pump 100, by way of the pump drive 130, can calculate estimations of various pump parameters, such as pump power consumption value aggregated or averaged over a period of time, the current system pressure value, pump speed, the total dynamic head value, the pump flow rate value, and a total gallons pumped value. These parameters can be measured and estimated for multiple discrete time periods, aggregated for multiple time periods or averaged over multiple time periods, and the raw data, or processed data, can be aggregated or averaged and stored in one or more of the virtual platforms such as on the onboard controller 134, the server, or the remote user device 380. Further, the user can enter various parametric aspects of the pool or aquatic application into the onboard controller 134, or the remote user device 380, such as a pool volume estimate, or municipal information such as energy costs. Accordingly, pump data, such as kilowatt-hours consumed by the pump 100 over time, gallons pumped over time, and turnover rate for a particular pool can be determined, stored, and/or manipulated in a virtual platform. Turnover rate is the number of times the full volume of the pool will be circulated through by pump 100 in a given time period. For example, if the pool volume is 20,000 gallons, and the pump 100 is operated for 2 hours each day at 100 GPM, the turnover rate is 0.6 turnovers per day or 4.2 turnovers per week (7 days). The turnover rate will be higher with a higher flow rate value, a longer run time per day, a higher frequency such as twice a day, and a lower pool volume, and vice versa. Other parameters that can be measured, estimated, tracked, or stored by the onboard controller 134, remote user device 380, or related virtual platform, include the time that the pump 100 is actively pumping fluid, and the time that the time that the pump 100, or the onboard controller 134, is generally on/initiated.

The pool pump 100 is configured to pump water within a pool or spa circulation system, and in some embodiments, external sensors and devices can be used within the pool circulation system and can communicate with the pump 100 by way of any of the wired or wireless communication methods mentioned above with the main circuit board 228 of the onboard controller 134. For example, one or more auxiliary pressure sensors can be positioned in various locations along the pool circulation system to measure pressure values, communicate the pressure values with the onboard controller 134, and ultimately help supplement or provide more accurate estimations or assessments of various pool parameters, such as the total dynamic head value. A number of useful auxiliary pressure sensor locations can include positioning the auxiliary pressure sensor on a suction side of the pump 100, positioning the auxiliary pressure sensor on the discharge side of the pump 100, or positioning the pressure sensor on a downstream side of a filter assembly, the filter assembly being downstream from, and on the pressure side of, the pump 100. Further, one or more auxiliary flow meters can be provided to measure flow rates at various points in the pump circulation system, and the auxiliary flow meters can communicate measured flow rate values to the onboard controller 134. The measured flow rate values can help provide more accurate estimations or assessments of various pool parameters such as total gallons of water pumped averaged or aggregated over a period of time, or a current pool turnover rate averaged or aggregated over a period of time.

Because each pool circulation system has unique qualities, such as unique frictional losses, which are determined in part by static features such as the length and diameter of the circulation system plumbing, the type of filter system used, or the type of backwash valve used and in part by dynamic features that can fluctuate based on the status of the pool circulation system such as pool filter loading characteristics, heater bypass, water feature activation, and other pool circulation system valve actuation, it is useful to collect and analyze data corresponding to the pool circulation system friction curve (system head pressure versus flow rate). In some embodiments, the system friction curve can be generated manually through user activation of the pump 100 at two or more pump speeds, and the onboard control 134 can estimate the total dynamic head values at each pump speed, or, alternatively, the system friction curve generation can be performed automatically or as a preprogrammed algorithm initiated automatically or through a one-click operation by the user. Data collected from auxiliary pressure sensors and auxiliary flow sensors can also be combined with the data collected/generated by the drive 130 (e.g., power consumption value over a period of time, the current system pressure value, the total dynamic head value, the pump flow rate value, and total gallons pumped value) in order to provide higher-accuracy pump performance data and/or higher accuracy system friction curves.

Figure 23:
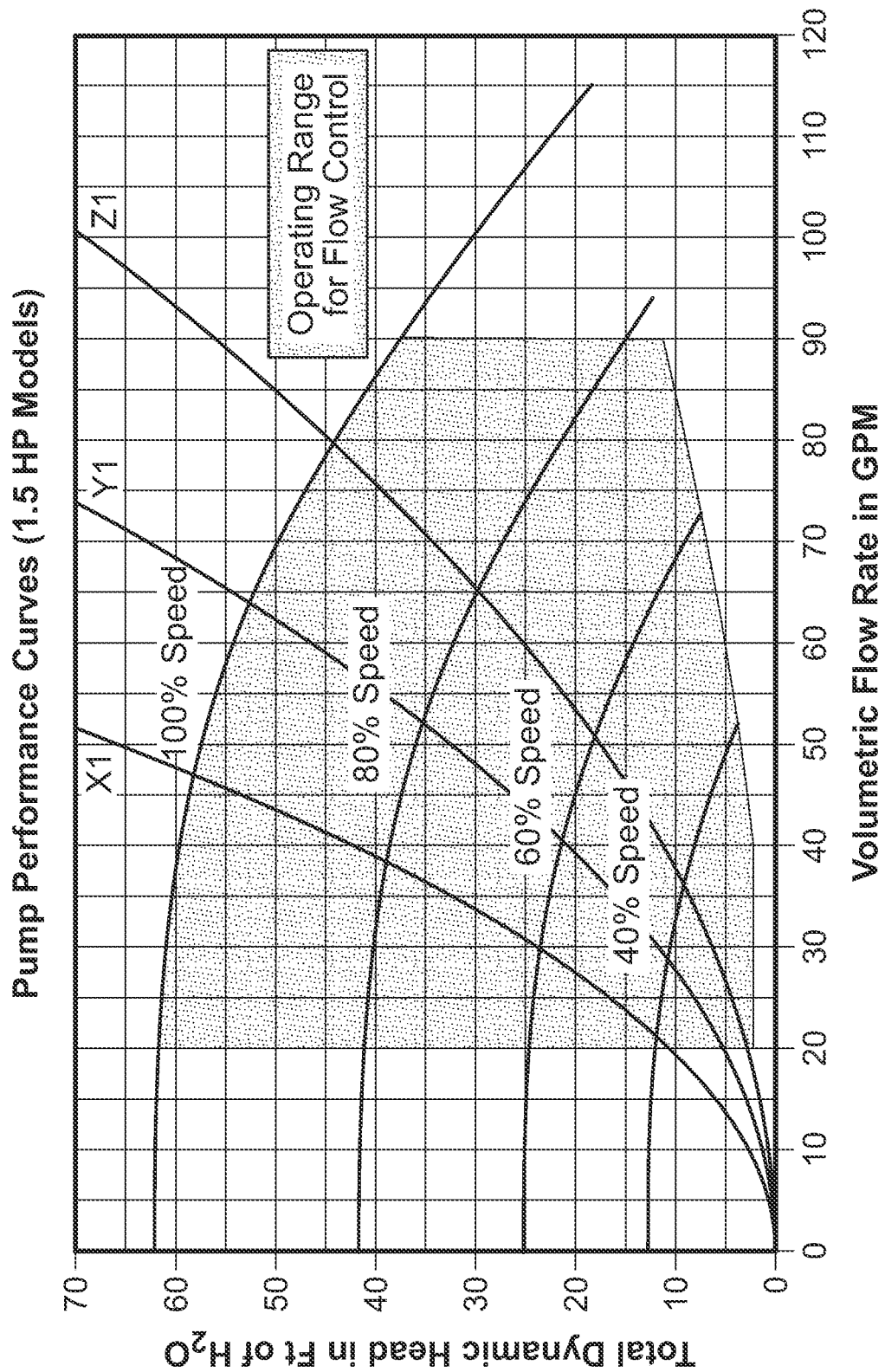
FIG. 23 is an exemplary pump performance curve graphing total dynamic head of a pump versus volumetric rate for various speed percentages of a 1.5 HP pump.
Figure 24:
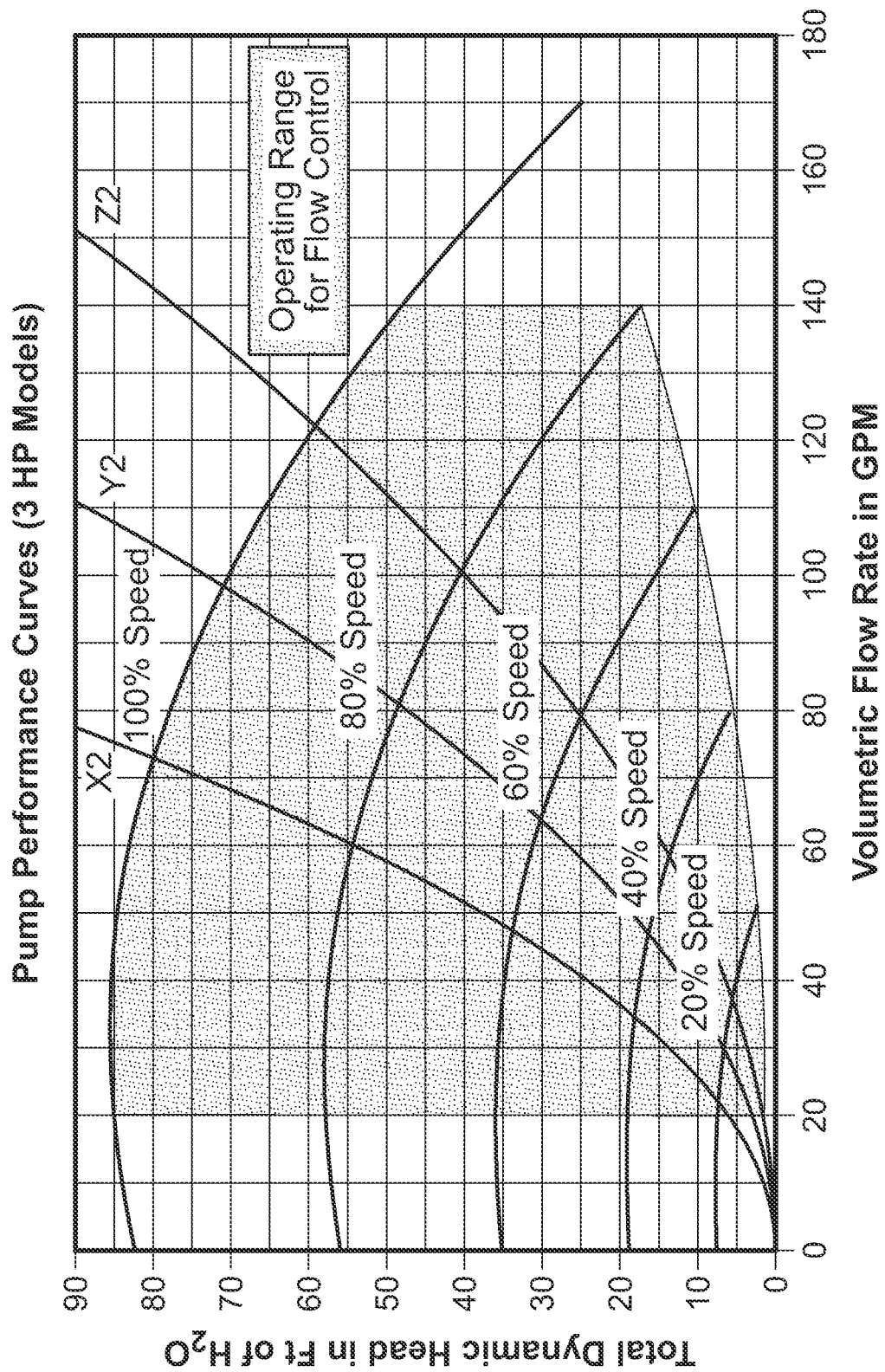
FIG. 24 is an exemplary pump performance curve graphing total dynamic head of a pump versus volumetric rate for various speed percentages of a 3 HP pump.

FIGS. 23 and 24 illustrate system friction curves generated using the foregoing techniques, overlayed onto performance curves for the pump 100 in the form of a 1.5 HP model (FIG. 23) and a 3 HP model (FIG. 24). For example, FIG. 23 illustrates curves X1, Y1, and Z1, and FIG. 24 illustrates curves X2, Y2, and Z2. The differences in the curves X1, Y1, and Z1 in FIG. 23 represent the differences in system frictional losses when the pump 100 is used in a first, a second, or a third exemplary pool circulation system, each having different system frictional characteristics when the pump is provided in the form of a 1.5 HP model. Similarly, the differences in the curves X2, Y2, and Z2 in FIG. 24 represent the differences in system frictional losses when the pump 100 is used in a first, a second, or a third exemplary pool circulation system, each having different system frictional characteristics when the pump is provided in the form of a 3 HP model.

Using the pump data aggregated at one or more of the onboard controller 134, the server, or the remote user device 380, the variable speed pumping system including the pump 100, e.g., the pool circulation system, can be placed into one or more categories. For example, depending on the generated system friction curve X1, Y1, Z1, X2, Y2, or Z2, the pool circulation system can be categorized into a "high load system", a "medium load system", or a "low load system". For instance, generated friction curves that fall within a certain percentile range, e.g., 0-20% of the X1 or X2 curves can be determined to be a "high load system", generated friction curves that fall within a certain percentile range, e.g., 0-20% of the Y1 or Y2 curves can be determined to be a "medium load system", and generated friction curves that fall within a certain percentile range, e.g., 0-20% of the Z1 or Z2 curves can be determined to be a "low load system".

The categories and curves presented herein are non-limiting and merely exemplary in nature. More or fewer categories for the pool circulation system can be provided for more granular categorizations and larger or smaller percentile ranges can be used to create more broadly encompassing or narrowly tailored categories. Additionally, multiple system friction curves can be generated for a single pool circulation system when the pool circulation system is operating under different frictional loss conditions. For example, a first system friction curve can be generated when one or more water features are activated, a second system friction curve can be generated when a pool heater is active, and a third system friction curve can be generated when the heater is bypassed and the water features are inactive. Also, the system friction curves can be updated over time to consider changes in resistance over time, such as increases in filter load. Thus, X1, Y1, Z1 and X2, Y2, Z2 can represent system friction curves developed at different times and valve conditions for the same pool circulation system rather than the pump 100 as it is used in different pool circulation systems.

Once the system friction curve or curves have been developed and/or the total gallons pumped value and an estimated current pool turnover rate have been calculated, the onboard controller 134, server, and/or the remote user device 380 can provide a variety of recommendations to the pool owner. In some embodiments, based on the total gallons pumped value over a period of time, a recommendation can be provided to increase or decrease the pool turnover rate depending on the pool size input by the user or a pool use factor input by the user or determined by way of a bather load sensing device. For example, based on the pool size input by the user, pool use factor, and the calculated total gallons pumped value over a period of time, it can be determined whether the user is turning over the pool more or less frequently than is required for adequate pool sanitation. The pool use factor input by the user can be provided in the form of a broad category input, such as "high", "medium", or "low", the pool use factor can be provided in the form of a numerical value, such as on a scale of 1-10, or another quantification. The bather load, e.g., the total number of bathers within the pool can be detected by way of a visual sensor or manually input by the user such as the number of bathers and the time in the pool. Accordingly, the onboard controller 134, server, and/or the remote user device 380 can provide a recommended, updated pump operation schedule(s) along with motor speed and flow rate recommendations to the user that will provide adequate pool water filtration while reducing the energy consumed by the pump 100 by way of an updated turnover rate. For example, the updated pump operation schedule can include more or less hours of pump operation time, different days of pump operation, higher or lower pump speed, and/or higher or lower pump flow rate values in order to implement the appropriate turnover rate and reduce pump operating costs. An estimated reduction in operating costs can be calculated based on an estimated, updated power consumption value determined for the updated pump operation schedule. In some forms, a recommended, updated priming speed and maximum priming run time can be provided.

Alternatively, or in addition, based on the system friction curve or curves generated, and, consequently, a categorization as high load, medium load, or low load system, the measured or estimated pool turnover rate, along with the municipal energy costs input by the user, a recommended, updated pump schedule(s) can be provided. For example, the onboard controller 134, server, and/or the remote user device 380 can provide a recommended, updated pump operation schedule(s) along with motor speed and flow rate value recommendations to the user that will provide adequate pool water filtration while reducing the energy consumed by the pump 100 based on the system friction curve. For example, the updated pump operation schedule can include more or less hours of pump operation time, different days of pump operation, higher or lower pump speed, and/or higher or lower pump flow rates in order to reduce pump operating costs and optimize pump performance. In some forms, the updated pump schedule will include an increase or decrease in pump speed or flow rate value in order to achieve a target turnover rate value or target energy cost value in light of the estimated system frictional losses. In some forms, the updated pump schedule will include an increase in pump operation time or a decrease in pump operation time in order to achieve a target turnover rate value or target energy cost value in light of the estimated system frictional losses. In some forms, the updated pump schedule will include changes to the pump speed or flow rate value and the pump operation time in order to achieve a target turnover rate value or target energy cost value in light of system frictional losses.

For example, if the pool circulation system is determined to be a high load system, e.g., X1, X2 due to accumulated filter loading over time, in order to keep energy costs down and achieve a target energy cost value, the updated pump schedule can include an updated pump speed which is lower, but an updated pump operation time which is increased in order to maintain an acceptable target turnover rate value. This is due to the fact that pump operation energy costs decrease by a polynomial degree, such as by an order of three, in response to a decrease in pump speed, while the pump flow rate decreases proportionally to a decrease in pump speed. In contrast, if the pool circulation system is determined to be a low load system, the updated pump schedule can include an updated pump speed which is higher in order to optimize pump efficiency. In addition, for the low load system, the updated pump schedule can include an updated pump operation time which is decreased, to lower the energy costs and achieve a target energy cost value while keeping the turnover rate value at an acceptable level.

An estimated reduction in operating costs can be calculated based on an estimated, updated power consumption value determined for the updated pump operation schedule. In some forms, a recommended, updated priming speed and maximum priming run time can be provided. Further, recommendations can be provided as to the type of operation and times of operation of other pool pad equipment, such as valves in the pool circulation system, heaters, sanitation devices, water quality monitors, chlorinators, booter pumps, or other pool components. For example, if the pool circulation system is determined to be a high load system, a recommendation for more frequent heater bypass when the heater is not on can be provided. In addition, the onboard controller 134, server, and/or the remote user device 380 can display a cost comparison between the current pump operation schedule and the updated pump schedule(s). For example, a monthly or daily estimated energy cost comparison can be made between the current pump schedule and the updated pump schedule.

In some embodiments, based on the system friction curve, different pool equipment can be recommended for the pool circulation system that has fewer frictional losses, such as recommendations for a higher efficiency filtration system, heaters, sanitation devices, water quality monitors, chlorinators, booter pumps, valves, lower restriction backwash valves, etc. Similarly, different pool equipment can be recommended based on the estimated current pool turnover rate, such as different capacity filtration systems. Even further, the payback period associated with the purchase of new pool equipment as it relates to the cost savings resulting from using the purchased pool equipment in the pool circulation system can be displayed to the user on the onboard controller 134, server, and/or the remote user device 380. Accordingly, users can make informed pool equipment purchases that will optimize their pool circulation system and provide energy cost savings over time.

In some forms, the user can be notified through alerts, charts, graphs, visual displays and/or other user notification means on one or both of the remote user device 380 or the onboard controller 134. The user notification means can provide a comparison between the current pump operation schedule and one or more recommended, updated pump operation schedules. For example, the user notification means can present the cost savings per month provided by one or more recommended, updated pump operation schedules compared to the current pump operation schedule. Accordingly, the user can decide whether to change the current pump operation schedule to be correlated with one or more of the updated pump operation schedule recommendations, such as modifying the pump operation time, days of pump operation, higher or lower pump speed, and higher or lower pump flow rates. The pump operation schedule can be updated manually, semi-manually, or the updated pump operation schedule can be packaged together, presented as a single-click option for the user, and all of the pump operation parameters can be changed in one-click.

In some forms, the onboard controller 134, server, and/or the remote user device 380 will automatically optimize and update one or more of a pump motor speed, a pump flow rate value, pump operation schedule, a pool circulation system valve orientation, a pool heating schedule, a pool sanitization schedule and a filter backwash or filter cleaning schedule based on the system friction curve or the total gallons pumped value and current pool turnover rate, without the user having to interact with the onboard controller 134, server, and/or the remote user device 380. Accordingly, the current settings of the pump 100 will be overridden and updated. As mentioned above, because pool service professionals can monitor, control, and manage operation of the pump 100 remotely, any or all of the recommended changes above can be implemented remotely by the pool service professional in response to any or all of the recommendations provided.

Additionally, because the total gallons pumped value throughout the life of the pump 100 can be aggregated at the onboard controller 134, server, and/or the remote user device 380, periodic maintenance for the pump 100 or other pool pad equipment can be recommended based on various timeline milestones. For example, replacement of seals, filters, or other parts can be recommended after a certain number of gallons have been pumped by the pump 100, or after a particular amount of time has passed. The service recommendations can be provided by way of a notification to the user through alerts, messages, audio and/or visual displays and/or other user notification means on one or both of the remote user device 380 or the onboard controller 134.

Further, based on the current turnover rate of the pool circulation system, the pump 100 can be categorized as high-use, standard-use, or low-use. Indeed, larger pools or pools with a high pool use factor (mentioned above) will require higher pump speeds, higher flow rates, and longer or more frequent pump operation times than smaller pools with a low use factor. Accordingly, predetermined recommendations regarding a periodic maintenance schedule, what pool pad equipment to use/purchase, service types and schedules, and equipment replacement schedules can be provided in accordance with the pump use category or system friction curve category. For example, if the pump 100 is categorized as high-use or used in a high load system, the user can receive more frequent or different pump service notifications, such as filter cleaning or filter backwash, after a period of time or after a certain number of gallons pumped than if the pump 100 if categorized as standard-use or light-use or used in medium load or low load systems.

The user can also be notified to replace parts of the pump 100 that experience periodic wear such as mechanical seals and o-rings based on any of the pump data mentioned above, such as the passage of a period of time or after a total gallons pumped value. Another example is that the user can be instructed to backwash or clean a filter assembly in the pool circulation system if the measured or estimated pressure values, or an applicable portion of discrete generated system friction curve values, are too high for a period of time. Pump data analytics such as regression analysis can be performed at the onboard controller 134, the server, the remote user device 380, or at any other equipment that is network connected to the pump 100. Artificial intelligence and machine learning can be applied such that periodic changes in the pump 100 or pool circulation system can be controlled and predicted. In some embodiments, new pool pad products will be recommended based on the total gallons pumped or the time in service of the pump 100 such as a new filter assembly, a new pump 100 when it reaches end of life, or a new heater, chlorinator, sanitizer, etc. The recommendations provided for new pool pad products can also depend on the pump categorization as a severe duty, standard duty, or light duty system or use in a pool circulation system categorized as low load, medium load, or high load. Further, any or all of the controls, notifications, and analyses described herein can also be performed by way of the automation device 176 or mid-level automation device 180.

Figure 25:
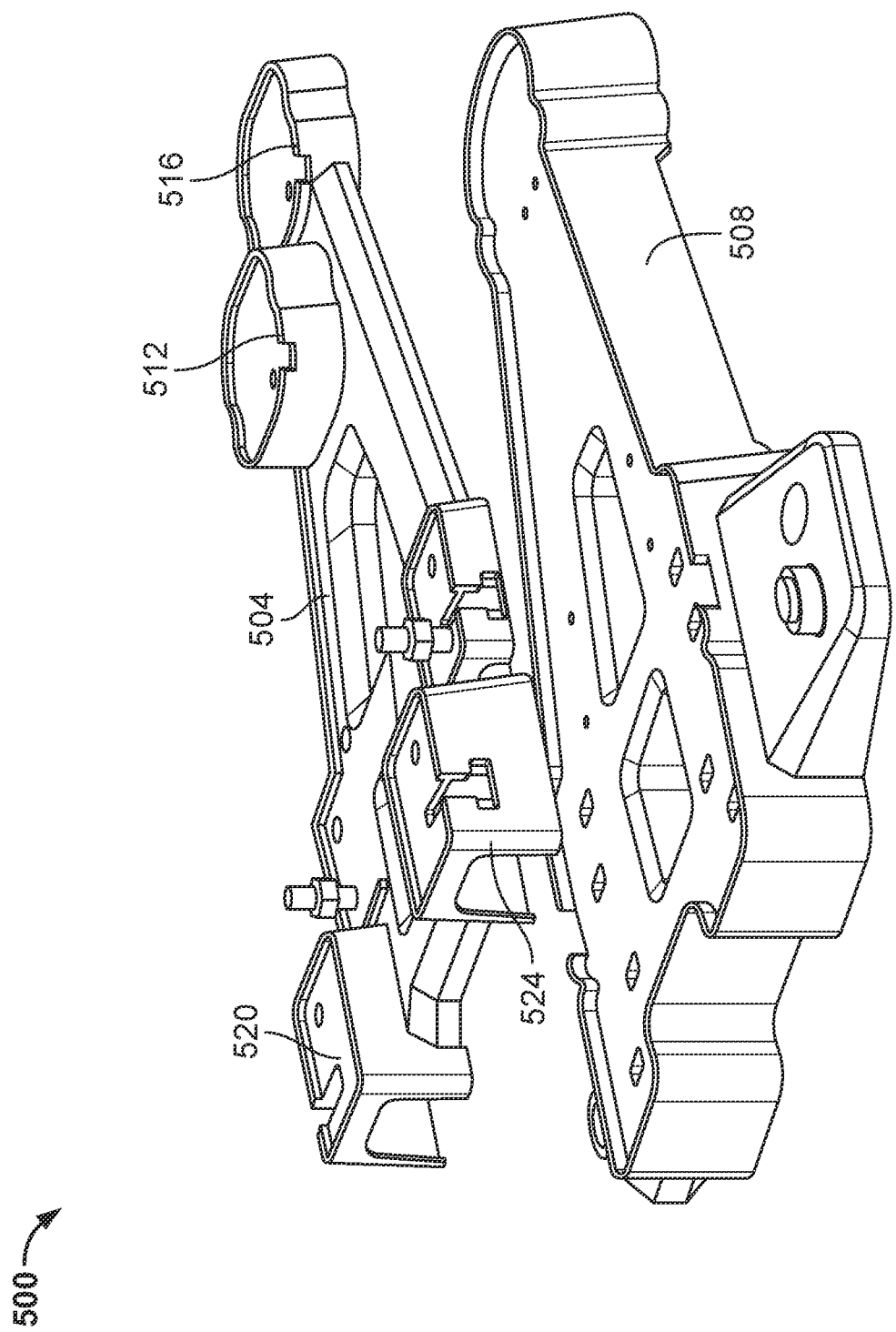
FIG. 25 is an exploded isometric view of a riser plate for a pump.

As shown in FIG. 25, in some alternative forms, a modular riser plate 500 is provided to support the body of the pump 100. The riser plate 500 can be provided in two parts, an upper plate 504 and a lower base 508, which can be selectively coupled together, to the pump 100, or to a surface. The upper plate 504 can include an upper mount 512 and a lower mount 516 that are configured to the coupled with the power end 106, and dual front mounts 520, 524 that are configured to be coupled to the wet end 104. The upper plate 504 can be removably attached to the lower base 508 to provide for height adjustments depending on the height of the inlet 112. Each of the upper plate 504 and the lower base 508 can be used independently as a riser for the pump 100. Accordingly, through the coupling and decoupling of the upper plate 504 with the lower base 508, and the geometry of where the upper mount 512 or the lower mount 516 contact the body of the pump 100, the modular riser plate 500 can provide four or more height adjustments for the pump 100. In this way, the riser plate 500 is suitable for use with the pump 100 regardless of whether the height of the inlet 112 is between 7 inches from the surface to 13 inches from the surface, or even 5 inches from the surface to 15 inches from the surface. In some forms, the pump 100 is coupled directly to the surface and no riser plate 500 is used.

Figure 26:
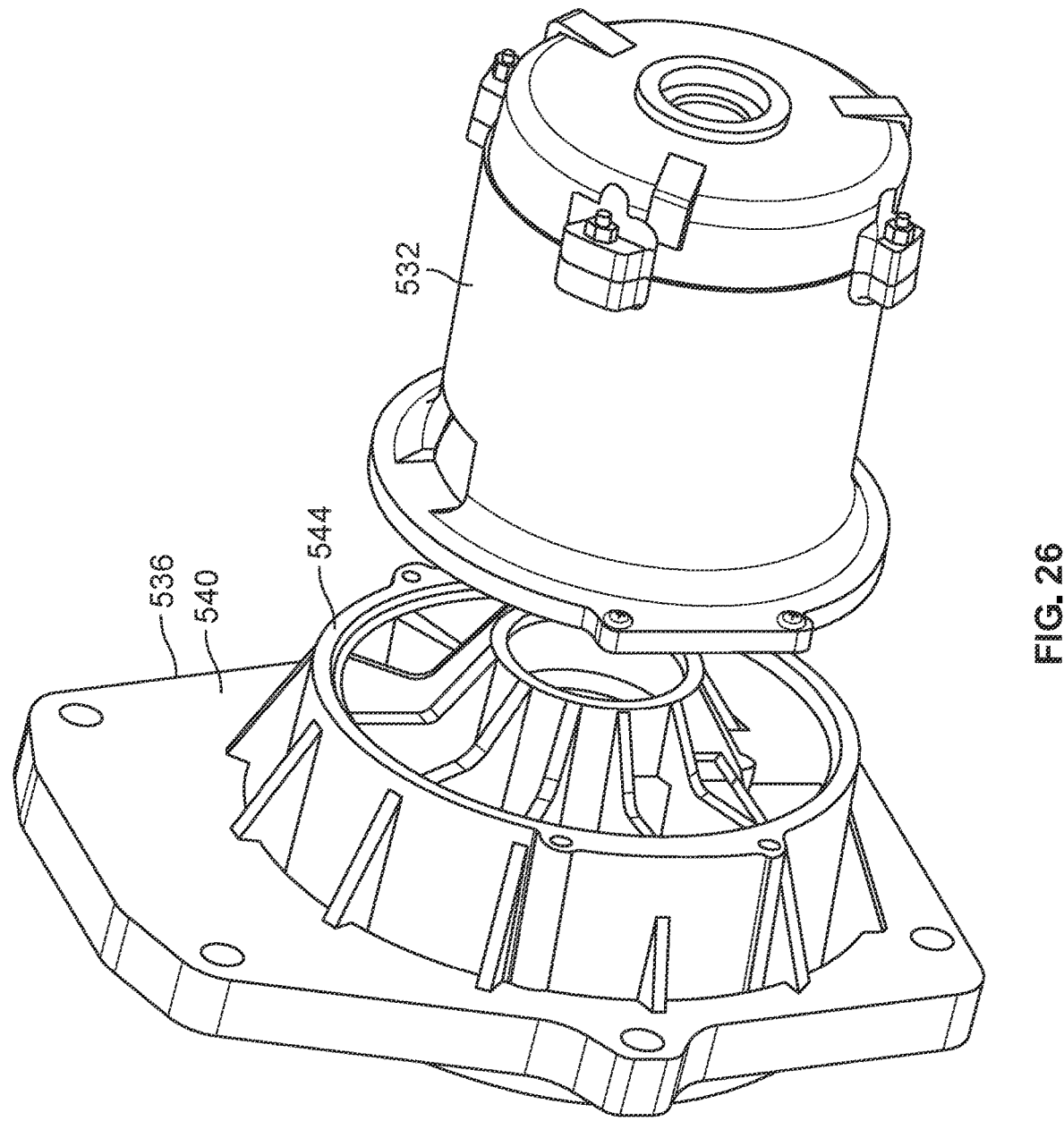
FIG. 26 is a front isometric view of a seal plate for a pump.
Figure 27B:
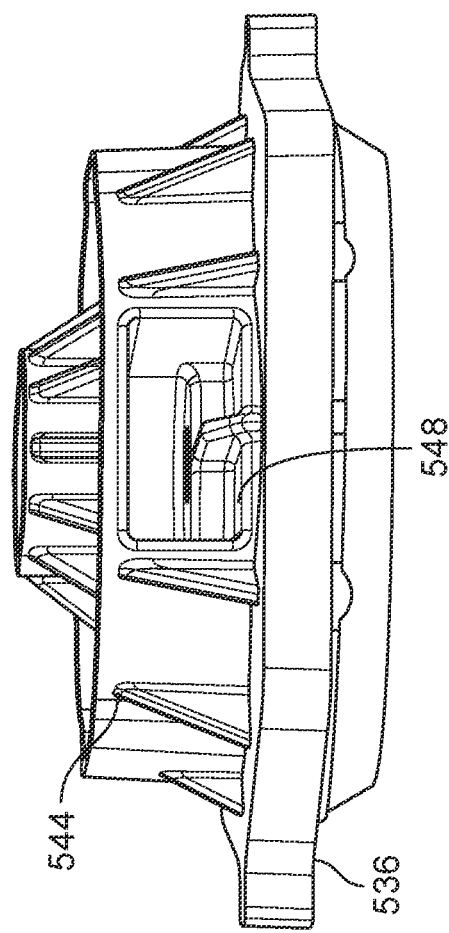
FIG. 27B is a bottom plan view of the seal plate of FIG. 24.
Figure 27A:
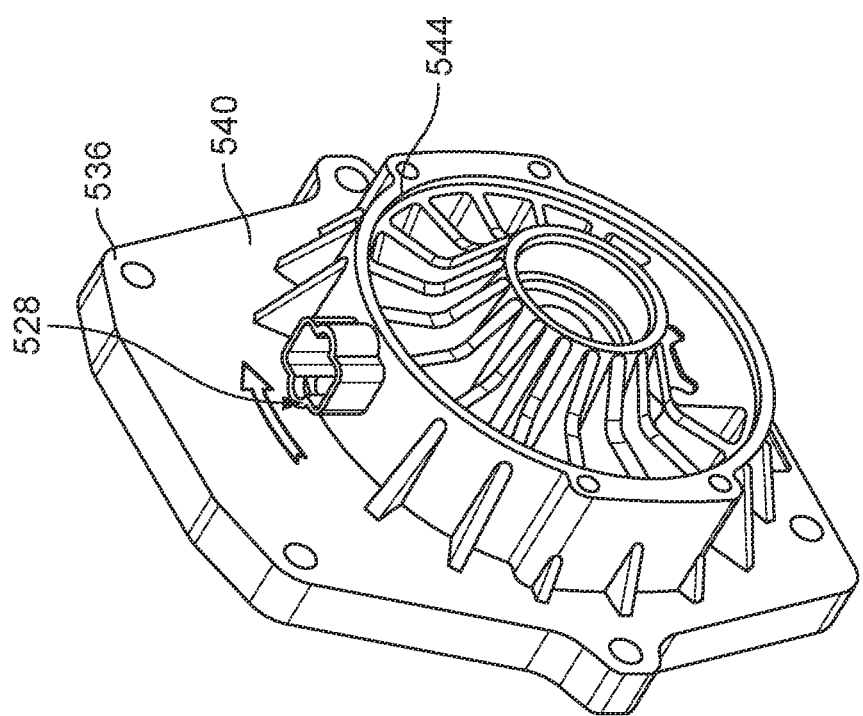
FIG. 27A is a front isometric view of the seal plate of FIG. 24.

Referring to FIGS. 26-27B, an alternative seal plate 536 can be provided. In some respects, the seal plate 536 is similar to a hybrid of the motor flange 172 and the seal plate 120 of FIG. 1. For example, the seal plate 536 includes a substantially flat front face 540 and a seal plate flange 544 that extends outwardly from the front face 540. As shown, the seal plate flange 544 is provided in a frustoconical shape. In some forms, the seal plate flange 544 is provided in a cylindrical or other three-dimensional geometrical shape. The entire seal plate 536 can be provided as any suitable plastic or polymer. Accordingly, any potential leakage around the seal plate 544 is not subject to galvanic corrosion because at the sealing face where the seal plate flange 544 meets a motor 532, two dissimilar metals are not in contact. Rather, the plastic seal plate flange 544 is in contact with the metal motor 532 such that the plastic seal plate flange 544 is acting as an insulting barrier. Further, as shown in FIGS. 25A and 25B, the plastic seal plate flange 544 can include a drive connector port 528 through which the motor 532 is electrically connected to a drive (not shown). The seal plate flange 544 can also include a drain port 548 that is offset from the point of contact between the seal plate flange 544 and the motor 532 such that any water leakage is diverted away from the metal housing of the motor 532. The drain port 548 can also facilitate drainage in the event that various mechanical seals in the vicinity of the seal plate 536 become worn over time.

In other embodiments, other configurations are possible. For example, those of skill in the art will recognize, according to the principles and concepts disclosed herein, that various combinations, sub-combinations, and substitutions of the components discussed above can provide appropriate cooling for a variety of different configurations of motors, pumps, electronic assemblies, and so on, under a variety of operating conditions.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

The invention claimed is:

1. A variable speed pumping system for an aquatic application, comprising:
   a variable speed pump including a motor, a drive, a housing including a drive cover, and an onboard controller including:
      a plurality of buttons formed in the drive cover and a plurality of lights associated with the plurality of buttons,
      a selectively removable touchscreen interface positioned on the drive cover,
      a main circuit board including a non-transitory computer readable medium, the main circuit board being electrically coupled to the touchscreen interface, the motor, and the drive;
   a wireless communication unit electrically coupled to the main circuit board, and
   a selectively removable IO expansion module including:
      a plurality of relay terminals, and
      a plurality of digital input terminals;
   a remote user device in wireless communication with the onboard controller and having a display; and
   a first auxiliary device electrically coupled to a first relay terminal of the plurality of relay terminals,
   wherein the onboard controller is configured to control one of a flow rate of the pump or a speed of the motor for at least one period of time and activate the first auxiliary device based on input received on one of the onboard controller or the remote user device.

2. The variable speed pumping system of claim 1, wherein the remote user device is configured to transmit instructions to the onboard controller to control one of the flow rate of the pump or the speed of the motor.

3. The variable speed pumping system of claim 1, wherein the remote user device is configured to transmit instructions to the onboard controller to control the activation of the first auxiliary device.

4. The variable speed pumping system of claim 1, wherein one or more of the remote user device or the onboard controller displays a status of the first auxiliary device.

5. The variable speed pumping system of claim 1, wherein the remote user device is configured to display a schedule during which the first auxiliary device is activated, receive an input to update the schedule, and transmit an updated schedule to the onboard controller.

6. The variable speed pumping system of claim 1, wherein the remote user device is configured to display a relay setup screen including a plurality of auxiliary device options, and the first auxiliary device is selected from the plurality of auxiliary device options.

7. The variable speed pumping system of claim 1, wherein the onboard controller activates the first auxiliary device during the at least one period of time.

8. The variable speed pumping system of claim 1, wherein the first auxiliary device is one of a lighting assembly, a salt chlorine generator, a water quality monitor, a booster pump, a chlorinator, a pool vacuum, a water feature, a fountain, or a heater.

9. The variable speed pumping system of claim 1, wherein the at least one period of time comprises a pump schedule during which the flow rate of the pump or the speed of the motor is periodically controlled, the pump schedule being programmable with the remote user device.

10. The variable speed pumping system of claim 9, wherein the first auxiliary device is programmed to be associated with the pump schedule using one of the remote user device or the onboard controller.

11. The variable speed pumping system of claim 1, wherein a second auxiliary device is electrically coupled to a second relay terminal of the plurality of relay terminals.

12. The variable speed pumping system of claim 11, wherein the onboard controller activates the first auxiliary device during a first time period and the second auxiliary device during a second time period.

13. The variable speed pumping system of claim 11, wherein the onboard controller activates both the first auxiliary device and the second auxiliary device during a first period of time.

14. The variable speed pumping system of claim 11, wherein the onboard controller only activates the first auxiliary device when the second auxiliary device is activated.

15. A variable speed pumping system for a swimming pool or spa, comprising:
   a variable speed pump including a motor, a drive, a housing, and an onboard controller including:
   a main circuit board including a non-transitory computer readable medium, the main circuit board being electrically coupled to the motor and the drive, and a selectively removable IO expansion module including a plurality of relay terminals being electrically coupled to the main circuit board; and an auxiliary device electrically coupled to one of the plurality of the relay terminals, wherein the onboard controller is configured to control one of a flow rate of the pump or a speed of the motor for a period time, activate the auxiliary device when a flow of water is delivered via the variable speed pump, and deactivate the auxiliary device when the flow of water is not delivered via the variable speed pump, in coordination with a pump operation schedule.

16. The variable speed pumping system of claim 15, wherein the onboard controller further comprises a wireless communication unit electrically coupled to the main circuit board.

17. The variable speed pumping system of claim 16, wherein the onboard controller is configurable with a remote user device.

18. The variable speed pumping system of claim 15, wherein activation of the auxiliary device is dependent on a volumetric flow of water through the variable speed pump.

19. The variable speed pumping system of claim 15, wherein activation of the auxiliary device is dependent on the speed of the motor.

20. A variable speed pumping system, comprising:

a variable speed pump including a motor, a drive, a housing, and an onboard controller including:

a removable touchscreen interface positioned on the housing, a main circuit board including a non-transitory computer readable medium, the main circuit board being electrically coupled to the motor and the drive, and a selectively removable IO expansion module including a plurality of relay terminals being electrically coupled to the main circuit board; and a plurality of auxiliary devices electrically coupled to the plurality of relay terminals, wherein the onboard controller is configured to control one of a flow rate of the pump or a speed of the motor according to a pump schedule and activation of each of the plurality of auxiliary devices is dependent on the pump schedule.

* * * * *